US012165601B2

(12) United States Patent
Chae

(10) Patent No.: US 12,165,601 B2
(45) Date of Patent: Dec. 10, 2024

(54) DISPLAY DEVICE

(71) Applicant: SAMSUNG DISPLAY CO., LTD., Yongin-si (KR)

(72) Inventor: Se Byung Chae, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/124,975

(22) Filed: Mar. 22, 2023

(65) Prior Publication Data

US 2023/0306916 A1 Sep. 28, 2023

(30) Foreign Application Priority Data

Mar. 24, 2022 (KR) ........................ 10-2022-0036858

(51) Int. Cl.

*G09G 3/3291* (2016.01)
*G09G 3/32* (2016.01)

(Continued)

(52) U.S. Cl.

CPC ............. *G09G 3/3291* (2013.01); *G09G 3/32* (2013.01); *G09G 3/3233* (2013.01); *G09G 3/3208* (2013.01); *G09G 2300/0842* (2013.01); *G09G 2310/027* (2013.01); *G09G 2310/0291* (2013.01); *G09G 2320/02* (2013.01); *G09G 2320/0276* (2013.01); *G09G 2330/028* (2013.01)

(58) Field of Classification Search

CPC ...... G09G 3/32; G09G 3/3208; G09G 3/3233; G09G 3/3291; G09G 2300/043; G09G 2300/0819; G09G 2300/0842; G09G 2310/0264; G09G 2310/027; G09G 2310/0291; G09G 2320/02; G09G 2320/0276; G09G 2330/028

See application file for complete search history.

(56) References Cited

U.S. PATENT DOCUMENTS 10,049,618 B2 8/2018 Jeong
11,462,146 B2 10/2022 Chae et al.

(Continued)

FOREIGN PATENT DOCUMENTS

KR 102306070 B1 9/2021
KR 1020220100778 A 7/2022

*Primary Examiner* — Julie Anne Watko
(74) *Attorney, Agent, or Firm* — CANTOR COLBURN LLP

(57) ABSTRACT

A display device includes: a pixel which emits light at a luminance corresponding to a data voltage applied thereto; and a data driver which supplies the data voltage to the pixel. The data driver includes: a first amplifier which outputs a first reference voltage; a first booster circuit including an input terminal connected to a first input terminal of the first amplifier, and an output terminal connected to a second input terminal of the first amplifier; a second amplifier which outputs a second reference voltage; a resistance string which receives the first and second reference voltages, and generate gamma voltages which are intermediate voltages between the first and second reference voltages; a digital-analog converter which outputs a gamma voltage corresponding to a gray scale of the pixel among the gamma voltages; and a source amplifier which outputs the gamma voltage as the data voltage.

11 Claims, 24 Drawing Sheets

(51) Int. Cl.
*G09G 3/3233* (2016.01)
*G09G 3/3208* (2016.01)

(56) References Cited

U.S. PATENT DOCUMENTS

| | | | | | |
|---|---|---|---|---|---|
| 2015/0325200 | A1* | 11/2015 | Rho | ..................... | G09G 3/3688<br>345/212 |
| 2022/0122542 | A1* | 4/2022 | Kim | ..................... | G09G 3/2074 |

* cited by examiner

DISPLAY DEVICE

This application claims priority to Korean Patent Application No. 10-2022-0036858, filed on Mar. 24, 2022, and all the benefits accruing therefrom under 35 U.S.C. § 119, the content of which in its entirety is herein incorporated by reference.

BACKGROUND

1. Field

Various embodiments of the disclosure relates to a display device.

2. Description of Related Art

With the development of information technology, the importance of a display device, which is a connection medium between a user and information, has been emphasized, and various types of display devices, such as a liquid crystal display device and an organic light-emitting display device, are widely used in various fields.

A display device may include pixels configured to display an image, and a data driver configured to supply data voltages to the pixels. The pixels may emit light at a luminance corresponding to the amount of driving current that flows between a first power voltage and a second power voltage.

SUMMARY

In a display device, the first power voltage or the second power voltage for the pixels may be changed by an external noise or a power control operation. In such a display device, the data driver is desired to change data voltages in response to the changed first power voltage or second power voltage. If the data voltages do not rapidly change, an undesired horizontal line may be displayed on a display screen.

Various embodiments of the disclosure are directed to a display device in which data voltages can rapidly follow a change of a first power voltage of a pixel.

An embodiment of the disclosure provides a display device including: a pixel which emits light at a luminance corresponding to a data voltage applied thereto; and a data driver which supplies the data voltage to the pixel. In such an embodiment, the data driver includes: a first amplifier which outputs a first reference voltage; a first booster circuit including an input terminal connected to a first input terminal of the first amplifier, and an output terminal connected to a second input terminal of the first amplifier; a second amplifier which outputs a second reference voltage; a resistance string which receives the first reference voltage and the second reference voltage, and generate gamma voltages which are intermediate voltages between the first reference voltage and the second reference voltage; a digital-analog converter which outputs a gamma voltage corresponding to a gray scale of the pixel among the gamma voltages; and a source amplifier which outputs the gamma voltage as the data voltage.

In an embodiment, when a voltage of the input terminal of the first booster circuit increases, source current is generated from the output terminal of the first booster circuit, and when the voltage of the input terminal of the first booster circuit decreases, sink current is generated from the output terminal of the first booster circuit.

In an embodiment, the first input terminal of the first amplifier may be a non-inverting terminal, and the second input terminal of the first amplifier may be an inverting terminal.

In an embodiment, the first booster circuit may include: a first transistor including a gate electrode connected to the input terminal of the first booster circuit, a first electrode which receives a high voltage, and a second electrode connected to the output terminal of the first booster circuit; and a second transistor including a gate electrode connected to the input terminal of the first booster circuit, a first electrode connected to the output terminal of the first booster circuit, and a second electrode which receives a low voltage.

In an embodiment, the first transistor may be an N-type transistor, and the second transistor may be a P-type transistor.

In an embodiment, the data driver may further include a first resistor including a first electrode connected to the input terminal of the first booster circuit, and a second electrode which receive a first power voltage of the pixel.

In an embodiment, the data driver may further include a second booster circuit including an input terminal connected to a first input terminal of the second amplifier, and an output terminal connected to a second input terminal of the second amplifier.

In an embodiment, when a voltage of the input terminal of the second booster circuit increases, source current is generated from the output terminal of the second booster circuit, and when the voltage of the input terminal of the second booster circuit decreases, sink current is generated from the output terminal of the second booster circuit.

In an embodiment, the first input terminal of the second amplifier may be a non-inverting terminal, and the second input terminal of the second amplifier may be an inverting terminal.

In an embodiment, the second booster circuit may include: a third transistor including a gate electrode connected to the input terminal of the second booster circuit, a first electrode which receives a high voltage, and a second electrode connected to the output terminal of the second booster circuit; and a fourth transistor including a gate electrode connected to the input terminal of the second booster circuit, a first electrode connected to the output terminal of the second booster circuit, and a second electrode which receives a low voltage.

In an embodiment, the third transistor may be an N-type transistor, and the fourth transistor may be a P-type transistor.

An embodiment of the disclosure provides a display device including: a pixel which emit light at a luminance corresponding to a data voltage applied thereto; and a data driver which supplies the data voltage to the pixel. In such an embodiment, the data driver includes: a first amplifier which outputs a first reference voltage; a first resistor including a first electrode connected to a first input terminal of the first amplifier, and a second electrode; a second resistor including a first electrode connected to a second input terminal of the first amplifier, and a second electrode; a first booster circuit including an input terminal connected to the second electrode of the first resistor, and an output terminal connected to the second electrode of the second resistor; a second amplifier which outputs a second reference voltage; a resistance string which receives the first reference voltage and the second reference voltage, and generate gamma voltages which are intermediate voltages between the first reference voltage and the second reference voltage; a digital-analog converter which outputs a gamma voltage corresponding to a gray scale of the pixel among the gamma voltages; and a source amplifier which outputs the gamma voltage as the data voltage.

In an embodiment, when a voltage of the input terminal of the first booster circuit increases, source current is generated from the output terminal of the first booster circuit, and when the voltage of the input terminal of the first booster circuit decreases, sink current is generated from the output terminal of the first booster circuit.

In an embodiment, the first input terminal of the first amplifier may be a non-inverting terminal, and the second input terminal of the first amplifier may be an inverting terminal.

In an embodiment, the first booster circuit may include: a first transistor including a gate electrode connected to the input terminal of the first booster circuit, a first electrode which receives a high voltage, and a second electrode connected to the output terminal of the first booster circuit; and a second transistor including a gate electrode connected to the input terminal of the first booster circuit, a first electrode connected to the output terminal of the first booster circuit, and a second electrode which receives a low voltage.

In an embodiment, the first transistor may be an N-type transistor, and the second transistor may be a P-type transistor.

In an embodiment, the data driver may include: a third resistor including a first electrode connected to a first input terminal of the second amplifier, and a second electrode; a fourth resistor including a first electrode connected to a second input terminal of the second amplifier, and a second electrode; and a second booster circuit including an input terminal connected to the second electrode of the third resistor, and an output terminal connected to the second electrode of the fourth resistor.

In an embodiment, when a voltage of the input terminal of the second booster circuit increases, source current is generated from the output terminal of the second booster circuit, and when the voltage of the input terminal of the second booster circuit decreases, sink current is generated from the output terminal of the second booster circuit.

In an embodiment, the first input terminal of the second amplifier may be a non-inverting terminal, and the second input terminal of the second amplifier may be an inverting terminal.

In an embodiment, the second booster circuit may include: a third transistor including a gate electrode connected to the input terminal of the second booster circuit, a first electrode which receive as high voltage, and a second electrode connected to the output terminal of the second booster circuit; and a fourth transistor including a gate electrode connected to the input terminal of the second booster circuit, a first electrode connected to the output terminal of the second booster circuit, and a second electrode which receives a low voltage. In such an embodiment, the third transistor may be an N-type transistor, and the fourth transistor may be a P-type transistor.

DETAILED DESCRIPTION

Figure 1:
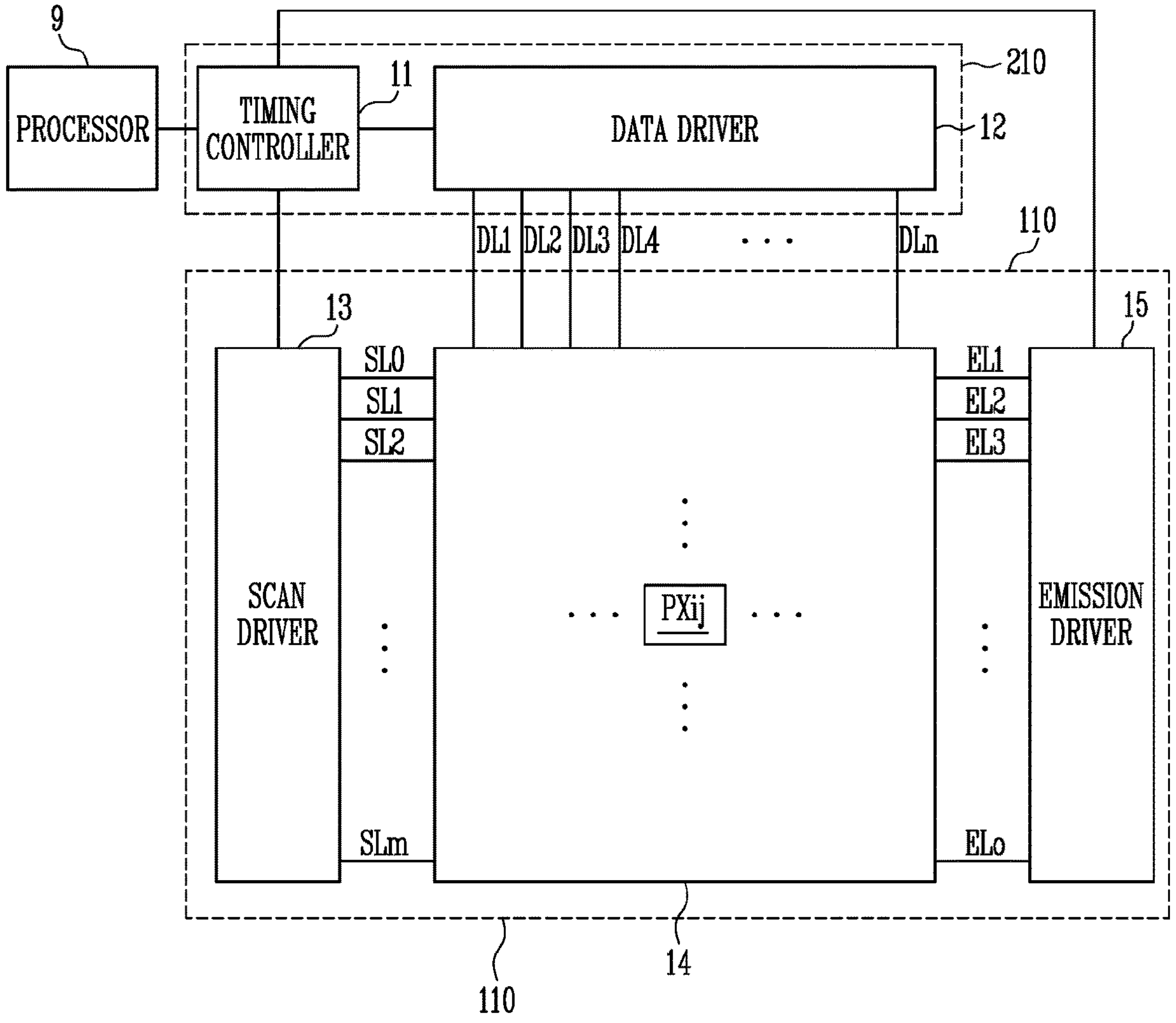
FIG. 1 is a diagram illustrating a display device in accordance with an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

For reference, the size of each component and the thicknesses of lines illustrating the component are arbitrarily expressed for the sake of explanation, and the disclosure is not limited to those illustrated in the drawings. In the drawings, the thicknesses of the components may be exaggerated to clearly express several layers and areas.

Furthermore, the expression "being the same" may mean "being substantially the same". In other words, the range of the expression "being the same" may refer to a range that can be conceded by those skilled in the art. The other expressions may also be expressions from which "substantially" has been omitted.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a diagram illustrating a display device in accordance with an embodiment of the disclosure.

Referring to FIG. 1, a display driver 210 of a display device may include a timing controller 11 and a data driver 12. A display component 110 of the display device may include a scan driver 13, a pixel component 14, and an emission driver 15. The configuration of the foregoing functional components pertaining to, for example, whether to integrate the foregoing functional components on one integrated circuit (IC) or a plurality of ICs or whether to mount the functional components on a substrate of the display component 110, may be changed in various ways depending on the specifications of the display device.

The timing controller 11 may receive grayscale signals and timing signals for each frame period from a processor 9. Here, the processor may correspond to at least one selected from a graphics processing unit (GPU), a central processing unit (CPU), an application processor (AP), and the like. The timing signals may include a vertical synchronization signal, a horizontal synchronization signal, a data enable signal, and the like.

Each cycle of the vertical synchronization signal may correspond to a corresponding frame period. Each cycle of the horizontal synchronization signal may correspond to a corresponding horizontal period. The grayscale signals may be supplied on a horizontal-line basis in response to a pulse of an enable level of a data enable signal during each horizontal period. The horizontal line may refer to pixels (e.g., a pixel line) connected to a same scan line and a same emission line.

The timing controller 11 may render the grayscale signals in consideration of the specifications of the display device 1. In an embodiment, for example, the processor 9 may provide a red grayscale signal, a green grayscale signal, and a blue grayscale signal for each unit dot. In an embodiment, for example, in which the pixel component 14 has an RGB stripe structure, pixels may correspond one to one to respective grayscale signals. In such an embodiment, rendering of the grayscale signals may not be performed. In an alternative embodiment, for example, where the pixel component 14 has a PENTILE™ structure, because adjacent unit dots may share a pixel, the pixels may not one-to-one correspond to the respective grayscale signals. In such an embodiment, the rendering of the grayscale signals may be performed. Grayscale signals that have been rendered or have not been rendered may be provided to the data driver 12. Furthermore, the timing controller 11 may provide a data control signal to the data driver 12. In addition, the timing controller 11 may provide a scan control signal to the scan driver 13, and may provide an emission control signal to the emission driver 15.

The data driver 12 may generate, using the grayscale signals and the data control signal received from the timing controller 11, data voltages to be provided to data lines DL1, DL2, DL3, . . . , DLm. Here, n is an integer greater than 0.

The scan driver 13 may generate, using scan control signals (e.g., a clock signal, a scan start signal, and the like) received from the timing controller 11, scan signals to be provided to the scan lines SL0, SL1, SL2, . . . , SLm. The scan driver 13 may sequentially supply scan signals, each having a turn-on level pulse, to the scan lines SL0 to SLm. The scan driver 13 may include scan stages including or configured in the form of a shift register. The scan driver 13 may generate scan signals in such a way as to sequentially transmit a scan start signal having a turn-on level pulse to a subsequent scan stage under the control of a clock signal. Here, m is an integer greater than 0.

The emission driver 15 may generate, using emission control signals (e.g., a clock signal, an emission stop signal, and the like) received from the timing controller 11, emission signals to be provided to the emission lines EL1, EL2, EL3, . . . , ELo. The emission driver 15 may sequentially supply emission signals, each having a turn-on level pulse, to the emission lines EL1 to ELo. The emission driver 15 may include emission stages, each of which is configured in the form of a shift register. The emission driver 15 may generate emission signals in such a way as to sequentially transmit an emission stop signal having a turn-off level pulse to a subsequent emission stage under the control of a clock signal. Here, o is an integer greater than 0.

The pixel component 14 includes pixels. Each pixel PXij may be connected to a corresponding data line, a corresponding scan line, and a corresponding emission line. The pixels may include pixels configured to emit a first color of light, pixels configured to emit a second color of light, and pixels configured to emit a third color of light. The first color, the second color, and the third color may be different colors from each other. In an embodiment, for example, the first color may be one of red, green, and blue. The second color may be one of red, green, and blue, other than the first color. The third color may be the remaining color among the red, green, and blue, other than the first color and the second color. Alternatively, magenta, cyan, and yellow may be used as the first to third colors.

Figure 2:
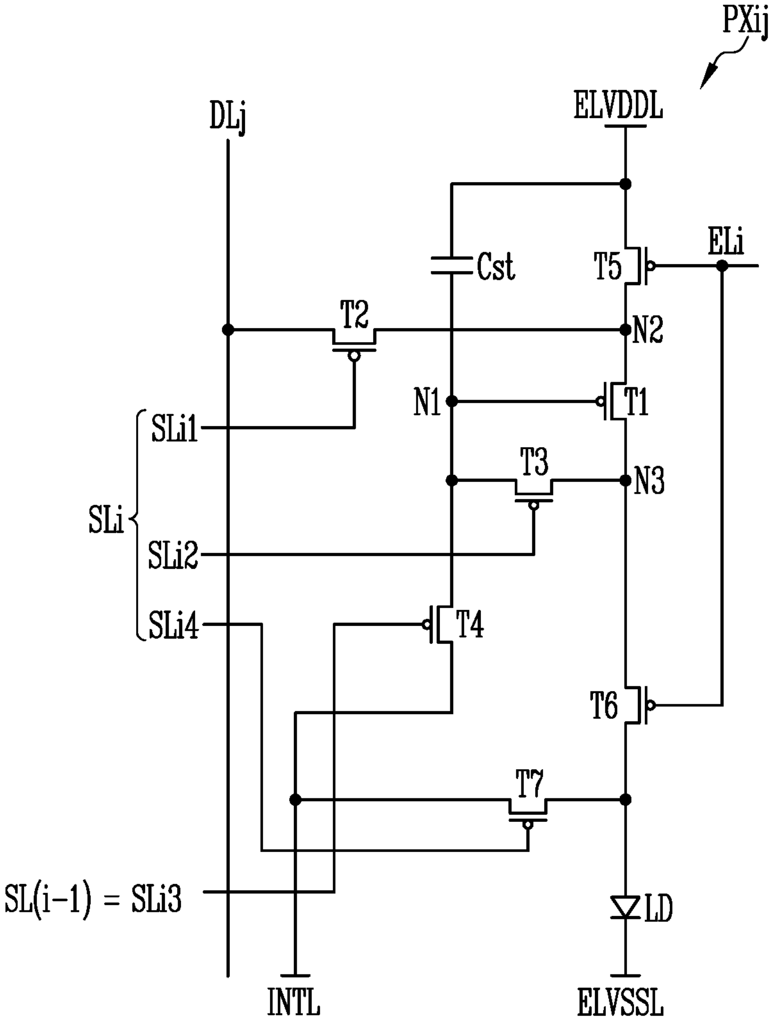
FIG. 2 is a diagram illustrating a pixel in accordance with an embodiment of the disclosure.

FIG. 2 is a diagram illustrating a pixel PXij in accordance with an embodiment of the disclosure.

Referring to FIG. 2, an embodiment of the pixel PXij includes transistors T1, T2, T3, T4, T5, T6, and T7, a storage capacitor Cst, and a light emitting element LD.

Hereinafter, an embodiment where the pixel PXij includes a circuit configured of P-type transistors will be described.

However, those skilled in the art may design a circuit configured of N-type transistors by changing the polarity of the voltage to be applied to the gate terminal of each transistor. Likewise, those skilled in this art may design a circuit configured of a combination of a P-type transistor and an N-type transistor. The term "P-type transistor" is a general name for transistors in which the amount of current increases when a voltage difference between a gate electrode and a source electrode increases in a negative direction. The term "N-type transistor" is a general name for transistors in which the amount of current increases when a voltage difference between a gate electrode and a source electrode increases in a positive direction. Each transistor may be configured in various forms such as a thin film transistor (TFT), a field effect transistor (FET), and a bipolar junction transistor (BJT).

The transistor T1 may include a gate electrode connected to a node N1, a first electrode connected to a node N2, and a second electrode connected to a node N3. The transistor T1 may be referred to as a driving transistor.

The transistor T2 may include a gate electrode connected to a scan line SLi1, a first electrode connected to a data line DLj, and a second electrode connected to the node N2. The transistor T2 may be referred to as a scan transistor.

The transistor T3 may include a gate electrode connected to a scan line SLi2, a first electrode connected to the node N1, and a second electrode connected to the node N3. The transistor T3 may be referred to as a diode connection transistor.

The transistor T4 may include a gate electrode connected to a scan line SLi3, a first electrode connected to the node N1, and a second electrode connected to an initialization line INTL. The transistor T4 may be referred to as a gate initialization transistor.

The transistor T5 may include a gate electrode connected to an i-th emission line ELi, a first electrode connected to a first power line ELVDDL, and a second electrode connected to the node N2. The transistor T5 may be referred to as an emission transistor. In an alternative embodiment, the gate electrode of the transistor T5 may be connected to an emission line different from the emission line to which a gate electrode of the transistor T6 is connected.

The transistor T6 may include the gate electrode connected to the i-th emission line ELi, a first electrode connected to the node N3, and a second electrode connected to an anode of the light emitting element LD. The transistor T6 may be referred to as an emission transistor. In an alternative embodiment, the gate electrode of the transistor T6 may be connected to an emission line different from the emission line that is connected to the gate electrode of the transistor T5.

The transistor T7 may include a gate electrode connected to a scan line SLi4, a first electrode connected to the initialization line INTL, and a second electrode connected to the anode of the light emitting element LD. The transistor T7 may be referred to as a light-emitting-element initialization transistor.

The storage capacitor Cst may include a first electrode connected to the first power line ELVDDL, and a second electrode connected to the node N1.

The light emitting element LD may include the anode connected to the second electrode of the transistor T6, and a cathode connected to a second power line ELVSSL. The light emitting element LD may be a light emitting diode. The light emitting element LD may include or be formed of an organic light emitting diode, an inorganic light emitting diode, a quantum dot/well light emitting diode, or the like.

The light emitting element LD may emit light having any one of a first color, a second color, and a third color. In an embodiment, as shown in FIG. 2, a single light emitting element LD is provided in each pixel, but not being limited thereto. Alternatively, a plurality of light emitting elements may be provided in each pixel in an embodiment. In such an embodiment, the plurality of light emitting elements may be connected in series, parallel, or series-parallel to each other.

A first power voltage may be applied to the first power line ELVDDL. A second power voltage may be applied to the second power line ELVSSL. An initialization voltage may be applied to the initialization line INTL. In an embodiment, for example, the first power voltage may be greater than the second power voltage. In an embodiment, for example, the initialization voltage may be the same as or greater than the second power voltage. In an embodiment, for example, the initialization voltage may correspond to the lowest data voltage among data voltages that can be provided. In an embodiment, the magnitude of the initialization voltage may be less than the magnitudes of the data voltages that can be provided.

The first power line ELVDDL may be connected in common to the pixels that form the pixel component 14. Furthermore, the second power line ELVSSL may be connected in common to the pixels that form the pixel component 14. In such an embodiment, the first power voltage of the first power line ELVDDL and the second power voltage of the second power line ELVSSL may be supplied in common (equally) to the pixels of the pixel component 14.

Figure 3:
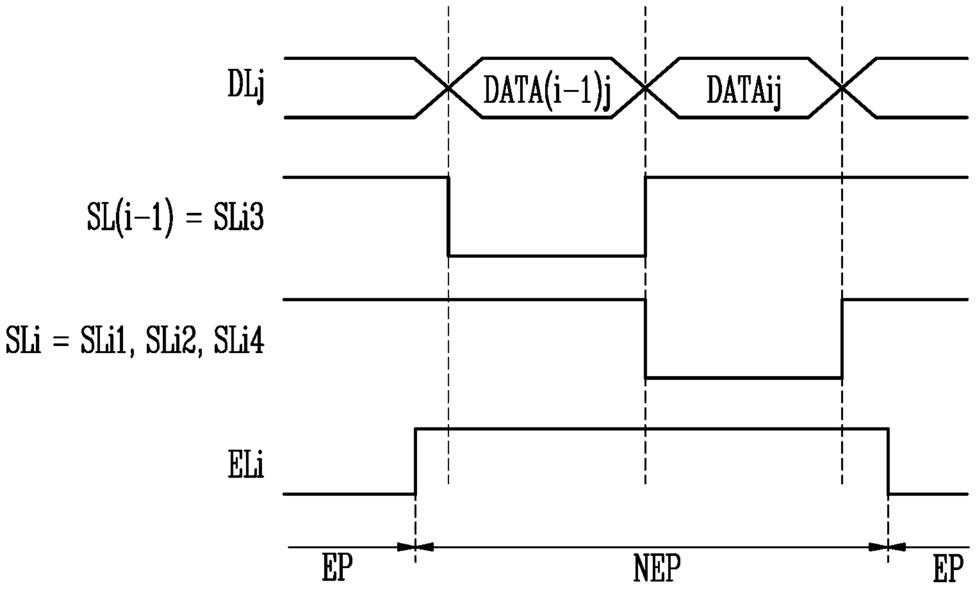
FIG. 3 is a diagram for describing a method of driving the pixel in accordance with an embodiment of the disclosure.

FIG. 3 is a diagram for describing a method of driving the pixel in accordance with an embodiment of the disclosure.

Hereinafter, for the convenience of explanation, it is assumed that each of the scan lines Sli1, Sli2, and Sli4 is an i-th scan line Sli, and that the scan line Sli3 is an (i−1)-th scan line SL(i−1). Here, connection relationships between the scan lines SLi1, SLi2, SLi3, and SLi4 may be changed in various ways depending on the embodiments. In an embodiment, for example, the scan line SLi4 may be an (i−1)-th scan line or an (i+1)-th scan line.

First, an emission signal having a turn-off level (a logic high level) may be applied to the i-th emission line Eli. A data voltage DATA(i−1)j for an i−1-th pixel may be applied to the data line DLj. A scan signal having a turn-on level (a logic low level) may be applied to the scan line SLi3. Whether the logic level is high or low may be changed depending on whether the transistor is a P-type or an N-type.

Here, since a scan signal having a turn-off level is applied to the scan lines SLi1 and SLi2, the transistor T2 is turned off, so that the data voltage DATA(i−1)j for the (i−1)-th pixel may be prevented from being drawn into the pixel PXij.

Here, since the transistor T4 is turned on, the node N1 is connected to the initialization line INTL, and the voltage of the node N1 is initialized. Since an emission signal having a turn-off level is applied to the emission line Eli, the transistors T5 and T6 are turned off, and the light emitting element LD may be prevented from being undesirably operated during an initialization voltage application process.

Next, a data voltage DATAij for the i-th pixel PXij is applied to the data line DLj, and a scan signal having a turn-on level is applied to the scan lines SLi1 and SLi2. Hence, the transistors T2, T1, and T3 enter a state capable of conducting electricity, and the data line DLj and the node N1 are electrically connected to each other. Therefore, a compensation voltage obtained by subtracting a threshold voltage of the transistor T1 from the data voltage DATAij is applied to the second electrode (i.e., the node N1) of the storage capacitor Cst. The storage capacitor Cst may maintain a voltage corresponding to the difference between the first power voltage and the compensation voltage. This period may be referred to as a threshold voltage compensation period or a data write period.

Furthermore, in an embodiment where in which the scan line SLi4 is an i-th scan line, the transistor T7 is turned on, so that the anode of the light emitting element LD and the initialization line INTL may be connected, and the light emitting element LD may be initialized with a magnitude of charges corresponding to the difference between the initialization voltage and the second power voltage.

Thereafter, as an emission signal having a turn-on level is applied to the i-th emission line Eli, the transistors T5 and T6 may be turned on. Therefore, a driving current path that connects the first power line ELVDDL, the transistor T5, the transistor T1, the transistor T6, the light emitting element LD, and the second power line ELVSSL may be formed.

The amount of driving current that flows through the first electrode and the second electrode of the first transistor T1 may be adjusted in response to the voltage maintained in the storage capacitor Cst. The light emitting element LD may emit light at a luminance corresponding to the amount of driving current. The light emitting element LD may emit light until an emission signal having a turn-off level is applied to the emission line ELi When the emission signal is at a turn-on level, pixels that receive the corresponding emission signal may be in a display state. Therefore, the period during which the emission signal is at a turn-on level may be referred to as an emission period EP (or an emission enable period). Furthermore, when the emission signal is at a turn-off level, pixels that receive the corresponding emission signal may be in a non-display state. Therefore, the period during which the emission signal is at a turn-off level may be referred to as a non-emission period NEP (or an emission inhibit period).

The non-emission period NEP described with reference to FIG. 3 may be provided for preventing the pixel PXij from emitting light at an undesired luminance during the initialization period and the data write period.

While data written in the pixel PXij is maintained (e.g., during one frame period), one or more non-emission periods NEP may be added because as the emission period EP is reduced, low gray scales may be effectively expressed, or motion in an image may be smoothly blur-processed.

Figure 4:
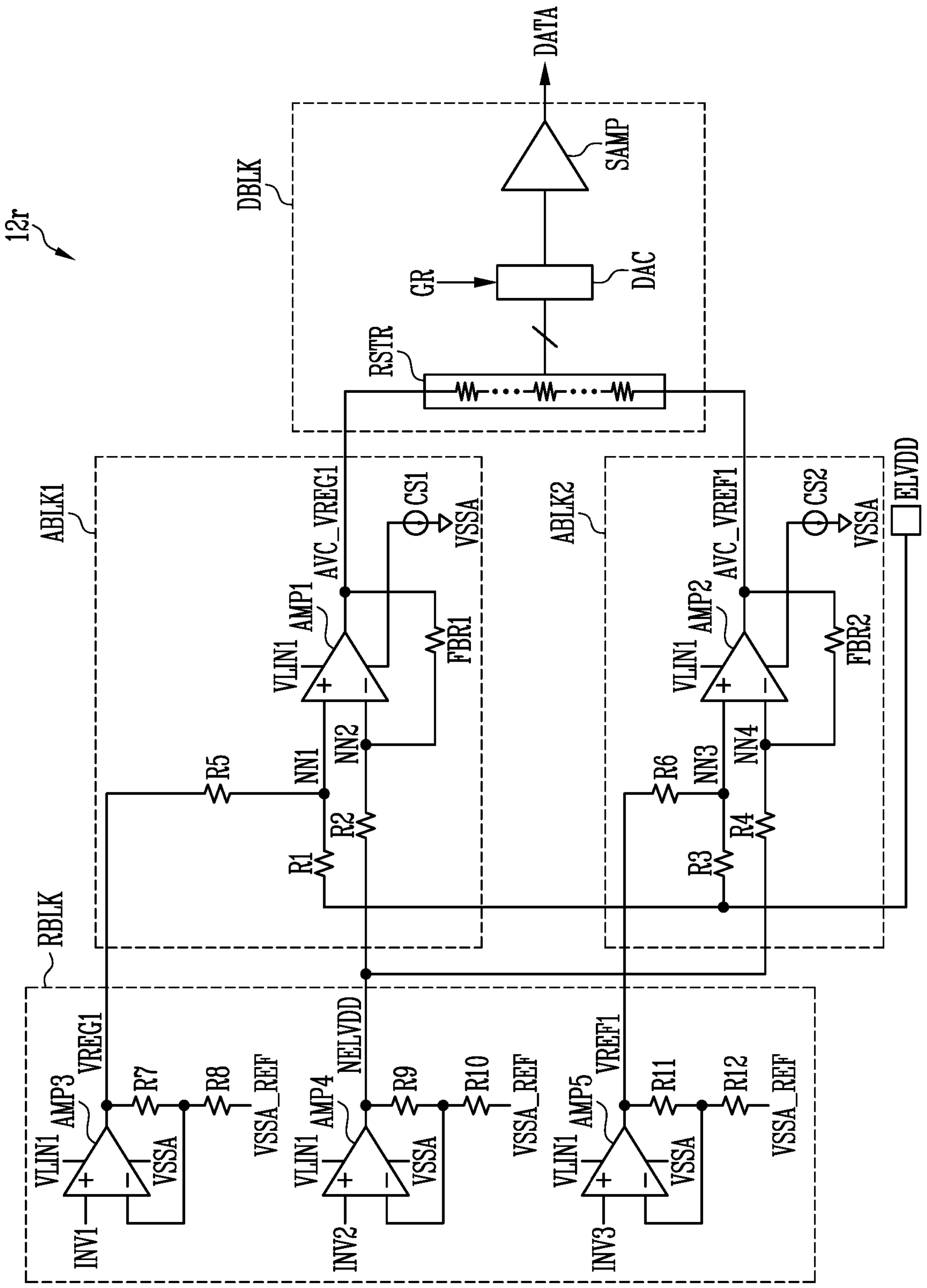
FIGS. 4 and 5 are diagrams for describing a data driver in accordance with an embodiment of the disclosure.
Figure 5:
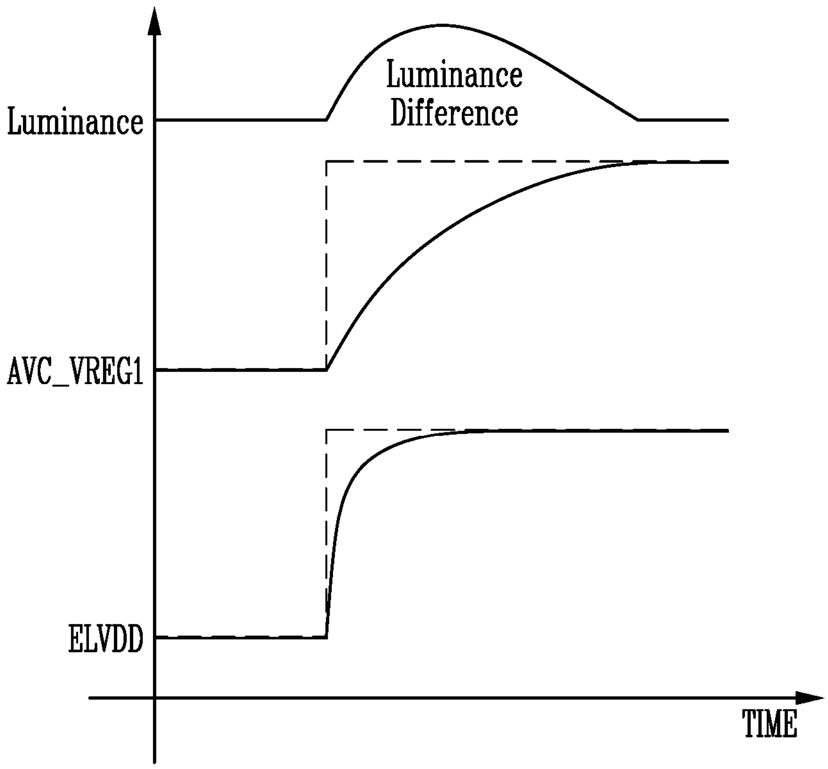

FIGS. 4 and 5 are diagrams for describing a data driver 12*r* in accordance with an embodiment of the disclosure.

Referring to FIG. 4, the data driver 12*r* in accordance with an embodiment of the disclosure may include a reference voltage generator RBLK, a first reference voltage adjuster ABLK1, a second reference voltage adjuster ABLK2, and a data voltage generator DBLK.

The reference voltage generator RBLK may generate reference voltages VREG1, NELVDD, and VREF1 based on input voltages INV1, INV2, and INV3. The reference voltage generator RBLK may include amplifiers AMP3, AMP4, and AMP5, and resistors R7, R8, R9, R10, R11, and R12. The amplifiers AMP3, AMP4, and AMP5 and amplifiers to be described below each may be driven using a high voltage VLIN1 and a low voltage VSSAas driving voltages thereof.

One end of the resistors R7 and R8 that are connected in series to each other may be connected to an output terminal of the third amplifier AMP3, and the other end of the resistors R7 and R8 may receive a low reference voltage VSSA_REF. A node set between the resistors R7 and R8 may be connected to an inverting terminal of the third amplifier AMP3. A non-inverting input terminal of the third amplifier AMP3 may receive an input voltage INV1. The third amplifier AMP3 may output a reference voltage VREG1 based on the magnitude of the input voltage INV1 and a resistance ratio of the resistors R7 and R8.

One end of the resistors R9 and R10 that are connected in series to each other may be connected to an output terminal of the fourth amplifier AMP4, and the other end of the resistors R9 and R10 may receive the low reference voltage VSSA_REF. A node set between the resistors R9 and R10 may be connected to an inverting terminal of the fourth amplifier AMP4. A non-inverting input terminal of the fourth amplifier AMP4 may receive an input voltage INV2. The fourth amplifier AMP4 may output a reference voltage NELVDD based on the magnitude of the input voltage INV2 and a resistance ratio of the resistors R9 and R10.

One end of the resistors R11 and R12 that are connected in series to each other may be connected to an output terminal of the fifth amplifier AMP5, and the other end of the resistors R11 and R12 may receive a low reference voltage VSSA_REF. A node set between the resistors R11 and R12 may be connected to an inverting terminal of the fifth amplifier AMP5. A non-inverting input terminal of the fifth amplifier AMP5 may receive an input voltage INV3. The fifth amplifier AMP5 may output a reference voltage VREG1 based on the magnitude of the input voltage INV3 and a resistance ratio of the resistors R11 and R12.

In an embodiment, the reference voltage VREG1 may be set to be greater than the reference voltage NELVDD, and the reference voltage NELVDD may be set to be greater than the reference voltage VREF1.

The first reference voltage adjuster ABLK1 may generate a first reference voltage AVC_VREG1 based on the reference voltages VREG1 and NELVDD and a first power voltage ELVDD. The first power voltage ELVDD may be a voltage applied to the first power line ELVDDL connected in common to the pixels of the pixel component 14. The first reference voltage adjuster ABLK1 may vary the first reference voltage AVC_VREG1 in response to a variation in the first power voltage ELVDD, and thus change data voltages. The first reference voltage adjuster ABLK1 may include a first amplifier AMP1, a first current source CS1, and resistors R1, R2, R5, and FBR1.

An output terminal of the first amplifier AMP1 may output the first reference voltage AVC_VREG1. A non-inverting output terminal of the first amplifier AMP1 may be connected to a first node NN1. An inverting output terminal of the first amplifier AMP1 may be connected to a second node NN2. Tail current of the first amplifier AMP1 may be implemented as the first current source CS1. A first electrode of the first resistor R1 may be connected to the first node NN1. A second electrode of the first resistor R1 may receive the first power voltage ELVDD. A first electrode of the second resistor R2 may be connected to the second node NN2. A second electrode of the second resistor R2 may receive the reference voltage NELVDD. A first electrode of the fifth resistor R5 may be connected to the first node NN2. A second electrode of the fifth resistor R5 may receive the reference voltage VREG1. A first electrode of the first feedback resistor FBR1 may be connected to the output terminal of the first amplifier AMP1. A second electrode of the first feedback resistor FBR1 may be connected to the second node NN2.

The second reference voltage adjuster ABLK2 may generate a second reference voltage AVC_VREF1 based on the reference voltages VREF1 and NELVDD and the first power voltage ELVDD. The second reference voltage adjuster ABLK2 may vary the second reference voltage AVC_VREF1 in response to a change in the first power voltage ELVDD, and thus vary data voltages. The second reference voltage adjuster ABLK2 may include a second amplifier AMP2, a first current source CS2, and resistors R3, R4, R6, and FBR2.

An output terminal of the second amplifier AMP2 may output the second reference voltage AVC_VREF1. A non-inverting output terminal of the second amplifier AMP2 may be connected to a third node NN3. An inverting output terminal of the second amplifier AMP2 may be connected to a fourth node NN4. Tail current of the second amplifier AMP2 may be implemented as the second current source CS2. A first electrode of the third resistor R3 may be connected to the third node NN3. A second electrode of the third resistor R3 may receive the first power voltage ELVDD. A first electrode of the fourth resistor R4 may be connected to the fourth node NN4. A second electrode of the fourth resistor R4 may receive the reference voltage NELVDD. A first electrode of the fifth resistor R6 may be connected to the third node NN3. A second electrode of the sixth resistor R6 may receive the reference voltage VREF1. A first electrode of the second feedback resistor FBR2 may be connected to the output terminal of the second amplifier AMP2. A second electrode of the second feedback resistor FBR2 may be connected to the fourth node NN4.

The data voltage generator DBLK may generate data voltage DATA based on the first reference voltage AVC_VREG1 and the second reference voltage AVC_VREF1. The data voltage generator DBLK may include a resistance string RSTR, a digital-analog converter DAC, and a source amplifier SAMP. FIG. 4 illustrates an embodiment where the data voltage generator DBLK includes only a single digital-analog converter DAC and only a single source amplifier SAMP to describe generation of the data voltage DATA for one pixel. Alternatively, the data voltage generator DBLK may include a plurality of digital-analog converters and a plurality of source amplifiers to generate data voltages for a plurality of pixels.

The resistance string RSTR may receive the first reference voltage AVC_VREG1 and the second reference voltage AVC_VREF1, and generate gamma voltages that are intermediate voltages between the first reference voltage AVC_VREG1 and the second reference voltage AVC_VREF1. In such an embodiment, respective nodes in the resistance string RSTR may generate different gamma voltages depending on resistance ratios thereof. When the first power voltage ELVDD varies, the first reference voltage AVC_VREG1 and the second reference voltage AVC_VREF1 may also vary, so that the gamma voltages may also vary.

The digital-analog converter DAC may output a gamma voltage corresponding to a gray scale GR of the pixel among the gamma voltages. In an embodiment, for example, the embodiment of FIG. 2 in which the transistor T1 is a P-type transistor, as the gray scale GR of the pixel increases, the gamma voltage outputted from the digital-analog converter DAC decreases, and as the gray scale GR of the pixel decreases, the gamma voltage outputted from the digital-analog converter DAC increases.

The source amplifier SAMP may output a gamma voltage received from the digital-analog converter DAC as the data voltage DATA. The outputted data voltage DATA may be directly applied to the data line, or may be applied to the data line through a demultiplexer. A gain of the source amplifier SAMP may be 1. Here, the magnitude of the gamma voltage and the magnitude of the data voltage DAT may be the same as each other.

FIG. 5 shows a case where the data driver 12*r* varies (e.g., increases) the first reference voltage AVC_VREG1 as the first power voltage ELVDD varies (e.g., increases). In this case, as shown in FIG. 5, since a variation rate of the first power voltage ELVDD is lower than a variation rate of the first reference voltage AVC_VREG1, a difference in luminance may be visible to a user that uses the display device (e.g., the luminance of a certain horizontal line in an image may differ from that of the other horizontal lines).

FIGS. 6 to 9 are diagrams for describing an operation of the first amplifier AMP1 in accordance with an embodiment of the disclosure. An operation in a case where the variation rate of the first power voltage ELVDD is lower than the variation rate of the first reference voltage AVC_VREG1 will be described in detail with reference to FIGS. 6 to 9.

Figure 6:
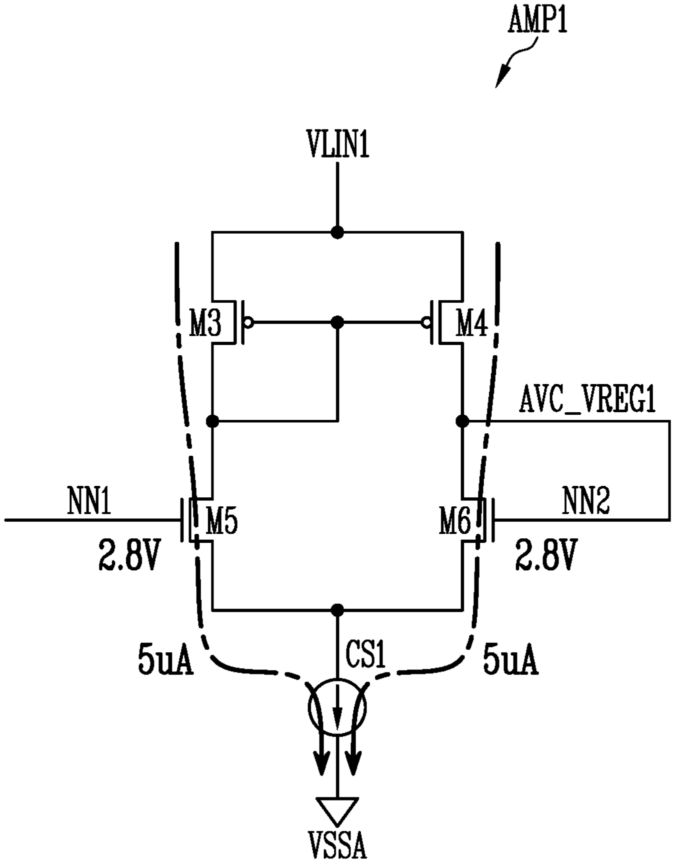
FIGS. 6 to 9 are diagrams for describing an operation of a first amplifier in accordance with an embodiment of the disclosure.
Figure 7:
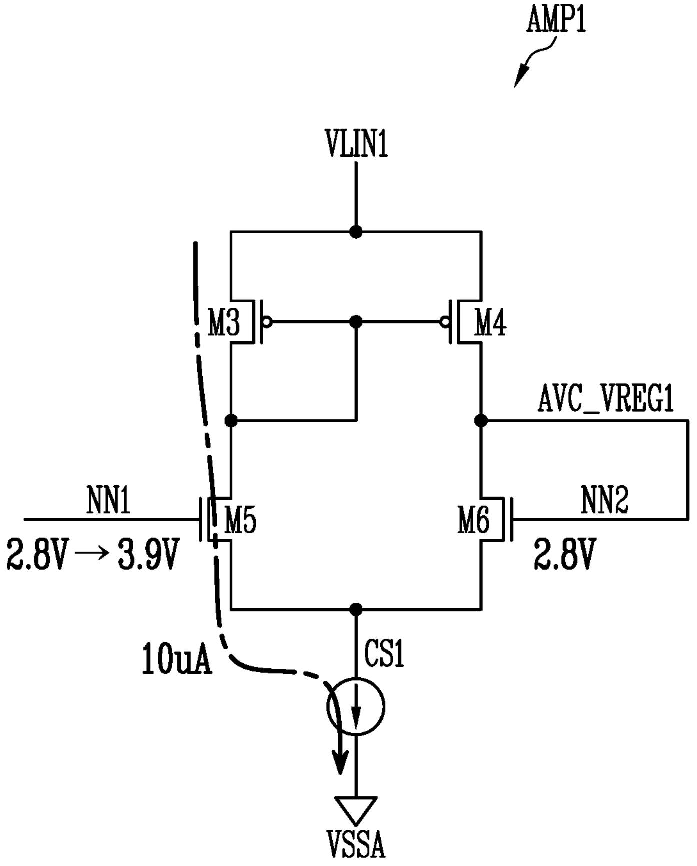
Figure 8:
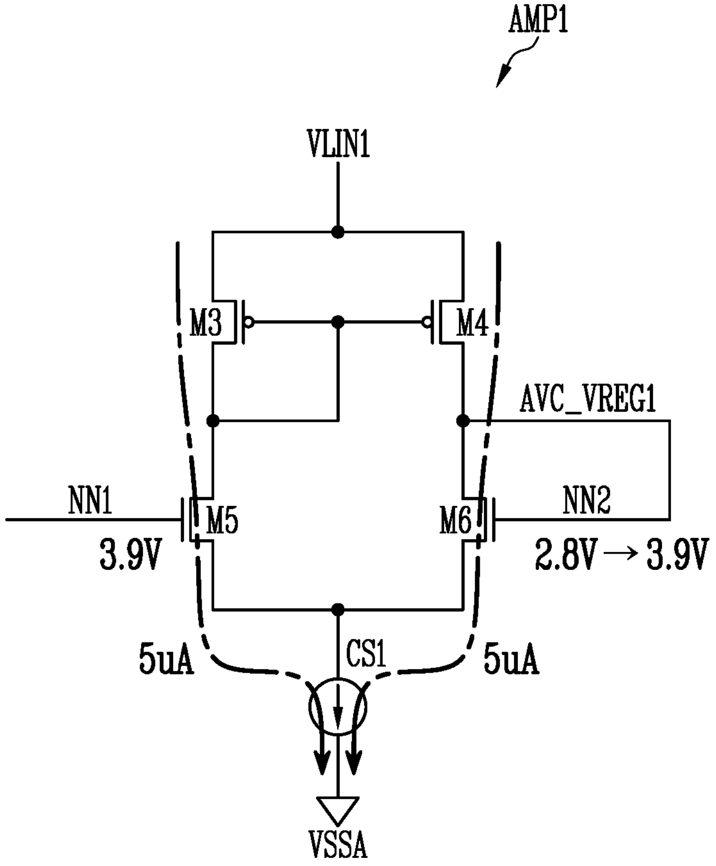

In FIGS. 6 to 8, the first amplifier AMP1 is illustrated as a simplified circuit to facilitate description of functions thereof, and the configuration of the first amplifier AMP1 is not limited to that of the circuit of FIG. 6. Referring to FIG. 4, the first feedback resistor FBR1 between the output terminal of the first amplifier AMP1 (or the node provided to output the first reference voltage AVC_VREG1) and the second node NN2 is omitted for convenience of description.

The first amplifier AMP1 may include P-type transistors M3 and M4 and N-type transistors M5 and M6. The transistor M3 may include a first electrode configured to receive a high voltage VLIN1, and a second electrode and a gate electrode that are connected to each other. The transistor M4 may include a first electrode configured to receive the high voltage VLIN1, a gate electrode connected to the gate electrode of the transistor M3, and a second electrode connected to the output terminal of the first amplifier AMP1. The transistor M5 may include a first electrode connected to the second electrode of the transistor M3, a second electrode connected to the first current source CS1, and a gate electrode connected to the first node NN1. The transistor M6 may include a first electrode connected to the output terminal of the first amplifier AMP1, a second electrode connected to the first current source CS1, and a gate electrode connected to the second node NN2.

Referring to FIG. 6, it is assumed that the first current source CS1 generates sink current of 10 microampere (μA). Furthermore, it is assumed that the same voltage of 2.8 volts (V) is applied to the first node NN1 and the second node NN2. Here, the magnitude of current that flows through the transistors M3 and M5 and the magnitude of current that flows through the transistors M4 and M6 may be the same as each other, and each may be 5 μA.

Referring to FIG. 7, it is assumed that the voltage of the first node NN1 is changed from 2.8 V to 3.9 V. This case may be the case where the first power voltage ELVDD suddenly increases. Here, since the voltage of the second node NN2 may not be immediately changed to 3.9 V, most current (e.g., 10 μA) may flow through the transistors M3 and M5.

Referring to FIG. 8, after a certain time has passed, the voltage of the second node NN2 may also be changed to 3.9 V. The time from a time point of FIG. 7 to a time point of FIG. 8 may be determined depending on the magnitude of sink current of the first current source CS1. In other words, as the sink current of the first current source CS1 increases, the time from the time point of FIG. 7 to the time point of FIG. 8 may be reduced.

Figure 9:
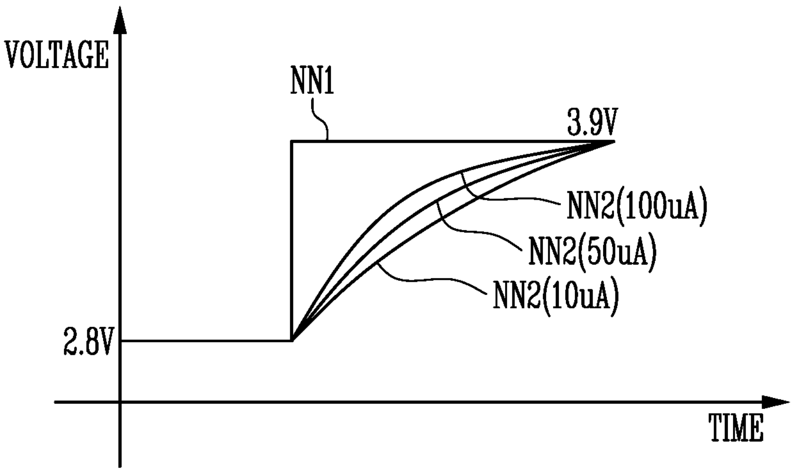

FIG. 9 is a graph illustrating changes in the voltage of the second node NN2 when the sink current of the first current source CS1 is set to 10 μA, 50 μA, and 100 μA. Referring to FIG. 9, it can be understood that even if the sink current of the first current source CS1 excessively increases, it is difficult to immediately follow the voltage of the first node NN1.

Figure 10:
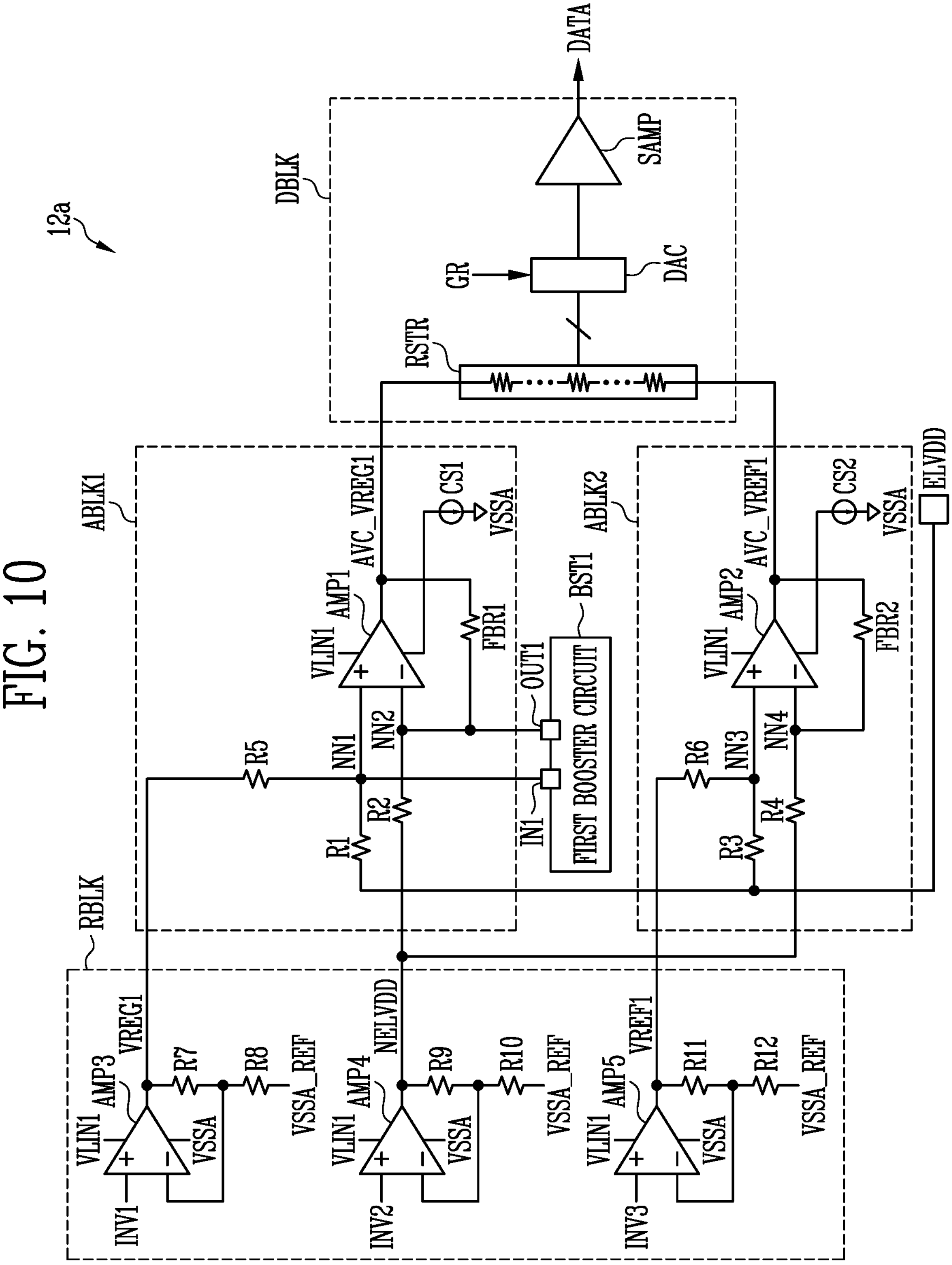
FIG. 10 is a diagram for describing a data driver in accordance with an embodiment of the disclosure.

FIG. 10 is a diagram for describing a data driver 12*a* in accordance with an embodiment of the disclosure.

Referring to FIG. 10, an embodiment of the data driver 12*a* may include a reference voltage generator RBLK, a first reference voltage adjuster ABLK1, a second reference voltage adjuster ABLK2, a data voltage generator DBLK, and a first booster circuit BST1. Hereinafter, any repetitive detailed description of the same or like elements as those of the data driver 12*r* described above with reference to FIG. 4 will be omitted.

In an embodiment, the first booster circuit BST1 may include an input terminal IN1 connected to a first input terminal of the first amplifier AMP1, and an output terminal OUT1 connected to a second input terminal of the first amplifier AMP1. The first input terminal of the first amplifier AMP1 may be a non-inverting terminal, and the second input terminal of the first amplifier AMP1 may be an inverting terminal.

Figure 11:
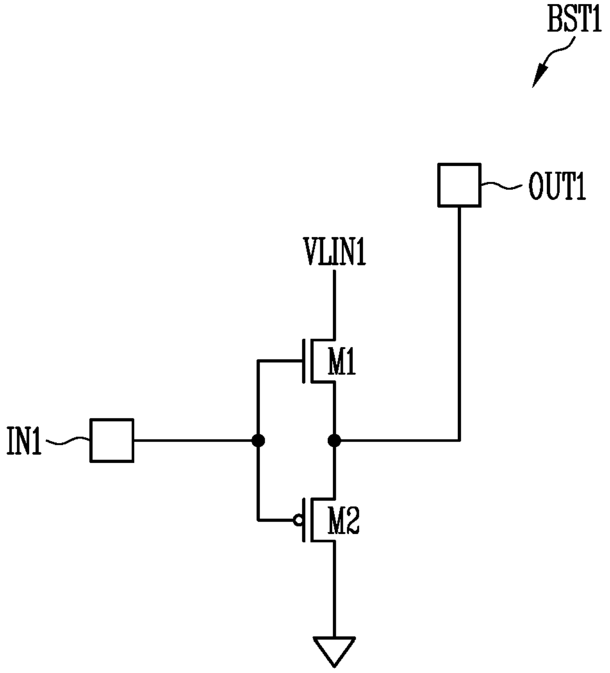
FIG. 11 is a diagram for describing a first booster circuit in accordance with an embodiment of the disclosure.

FIG. 11 is a diagram for describing the first booster circuit BST1 in accordance with an embodiment of the disclosure. Referring to FIG. 11, the first booster circuit BST1 may include a first transistor M1, and a second transistor M2.

The first transistor M1 may include a gate electrode connected to the input terminal IN1 of the first booster circuit BST1, a first electrode configured to receive a high voltage VLIN1, and a second electrode connected to the output terminal OUT1 of the first booster circuit BST1. The first transistor may be an N-type transistor.

The second transistor M2 may include a gate electrode connected to the input terminal IN1 of the first booster circuit BST1, a first electrode connected to the output terminal OUT1 of the first booster circuit BST1, and a second electrode configured to receive a low voltage (e.g., the ground voltage). The second transistor M2 may be a P-type transistor.

FIGS. 12 to 18 are diagrams for describing an operation of the first booster circuit BST1.

In the first booster circuit BST1, when the voltage of the input terminal IN1 increases, source current may be generated from the output terminal OUT1, and when the voltage of the input terminal IN1 decreases, sink current may be generated from the output terminal OUT1.

Figure 12:
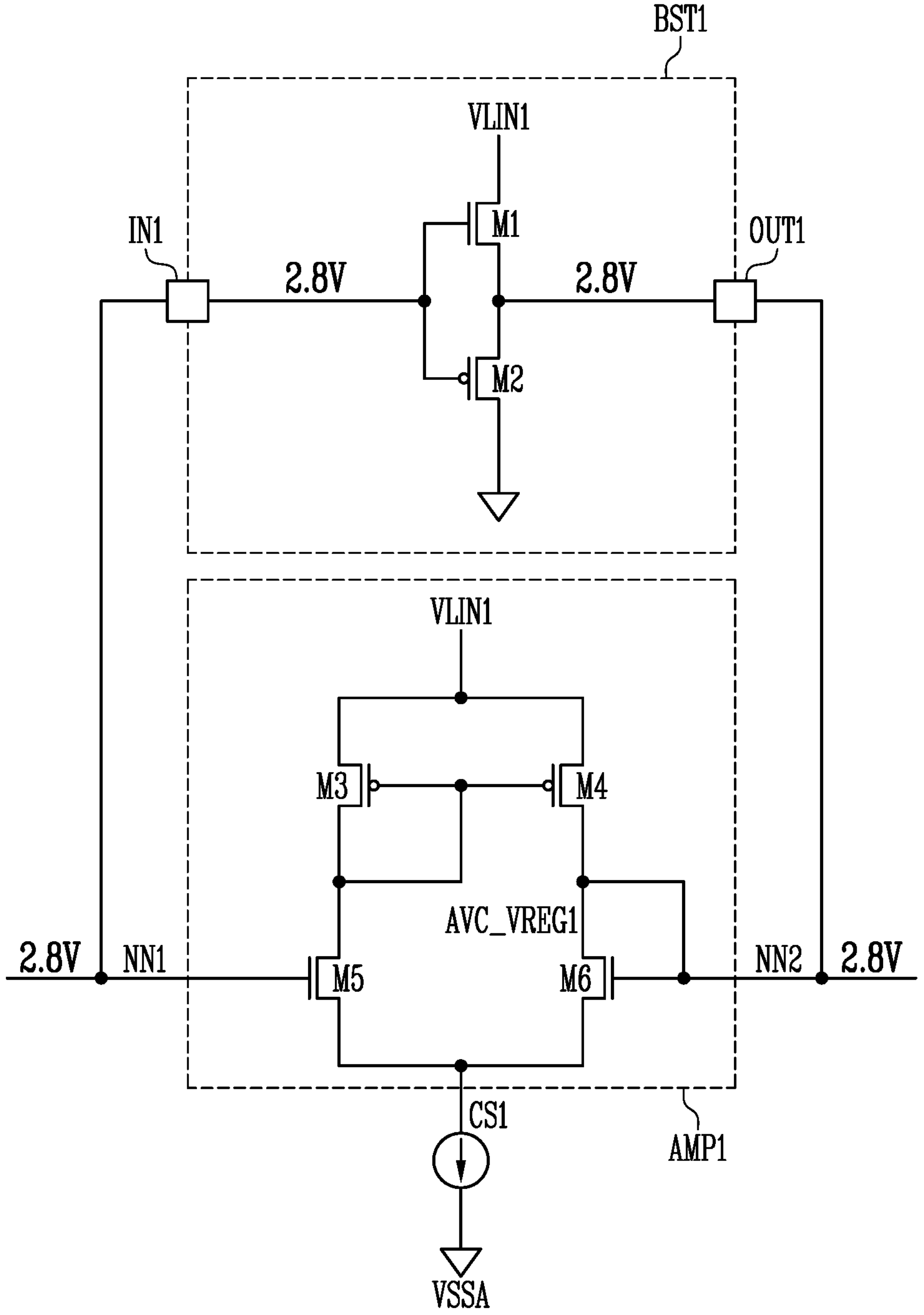
FIGS. 12 to 18 are diagrams for describing an operation of the first booster circuit.
Figure 13:
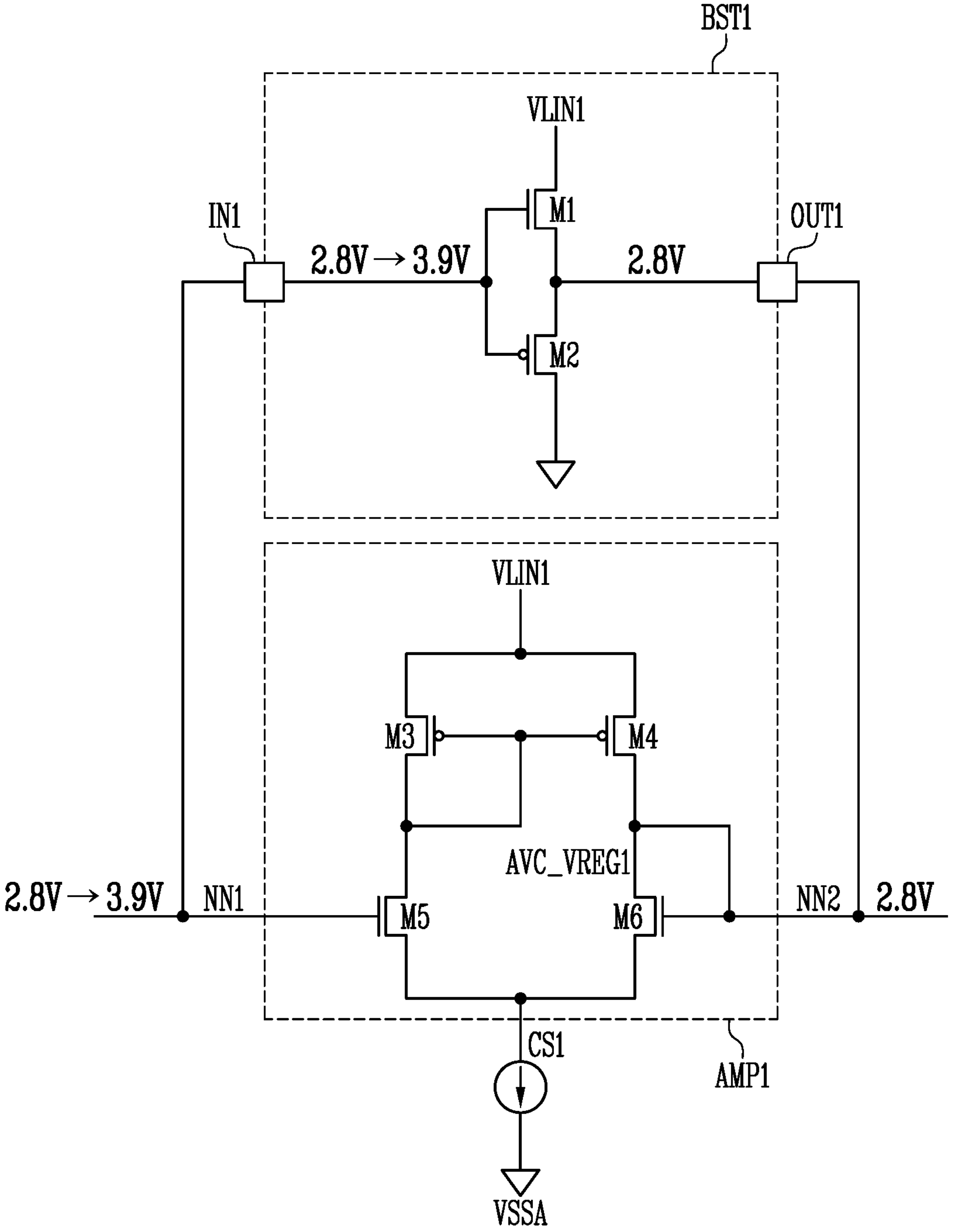
Figure 14:
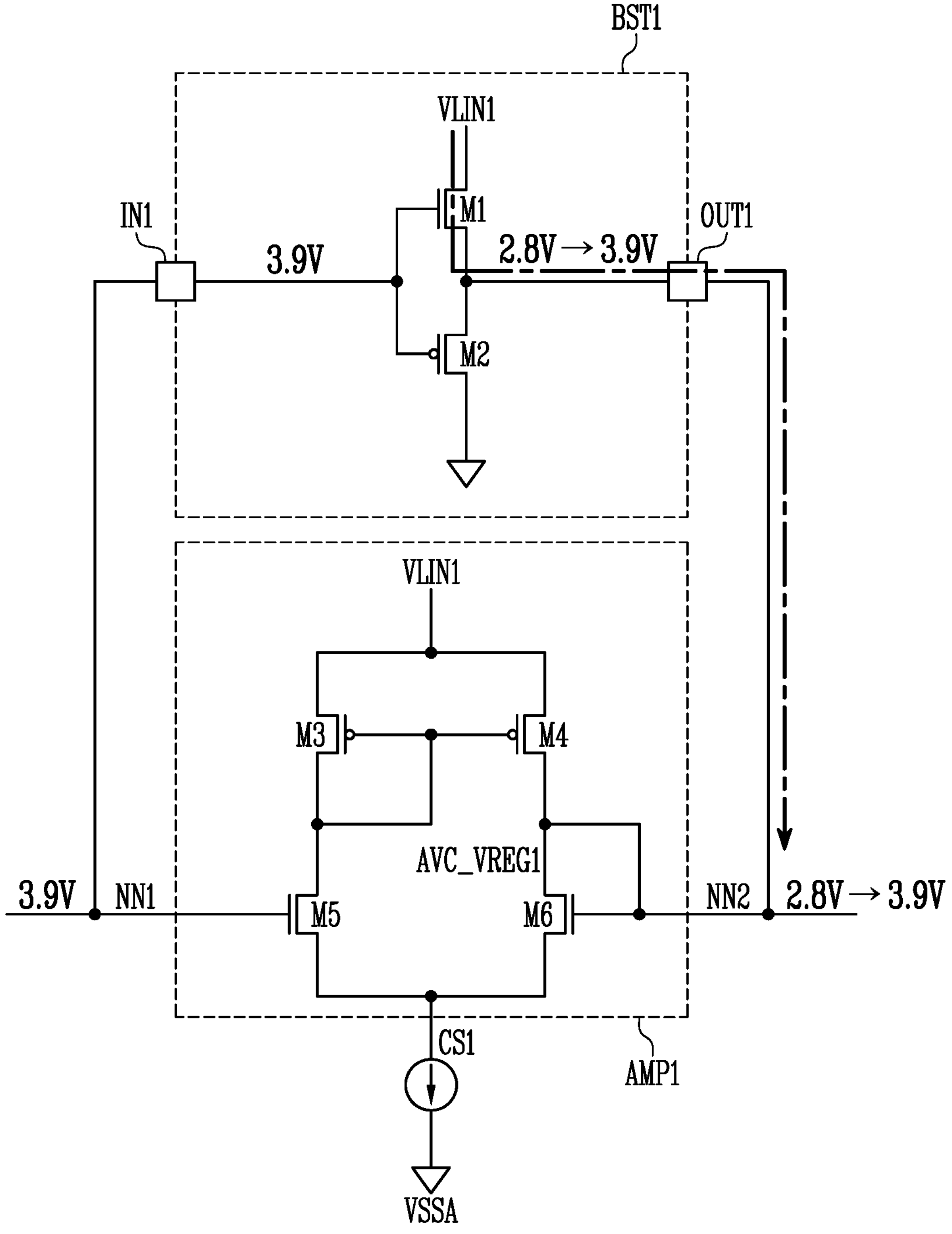

FIGS. 12 to 14 are diagrams for describing the case where the source current occurs from the first booster circuit BST1.

Referring to FIG. 12, it is assumed that the same voltage of 2.8 V is applied to the first node NN1 and the second node NN2. Here, since the gate voltage and the source voltage of the first transistor M1 are the same as each other, the first transistor M1 is in a turned-off state. Furthermore, since the gate voltage and the source voltage of the second transistor M2 are the same as each other, the second transistor M2 is in a turned-off state.

Referring to FIG. 13, it is assumed that the voltage of the first node NN1 increases from 2.8 V to 3.9 V. Here, as the voltage of the first node NN1 increases from 2.8 V to 3.9 V, the first transistor M1 is turned on by a gate-source voltage difference, and the second transistor M2 remains turned off.

Referring to FIG. 14, when the first transistor M1 is turned on by a gate-source voltage difference, current flows from the high voltage VLIN1 to the second node NN2 through the turned-on first transistor M1. Hence, the voltage of the second node NN2 may rapidly increase.

Figure 15:
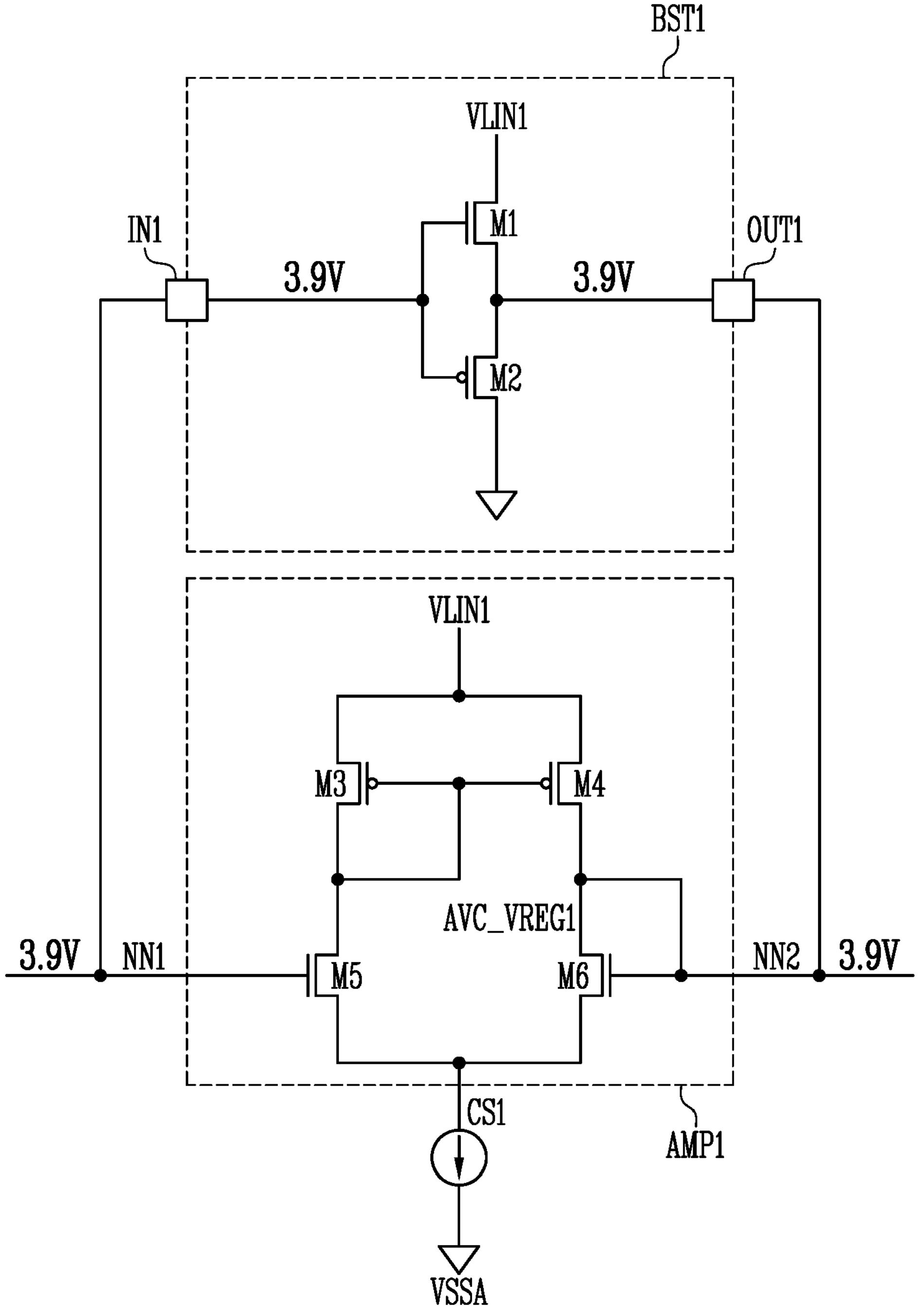
Figure 16:
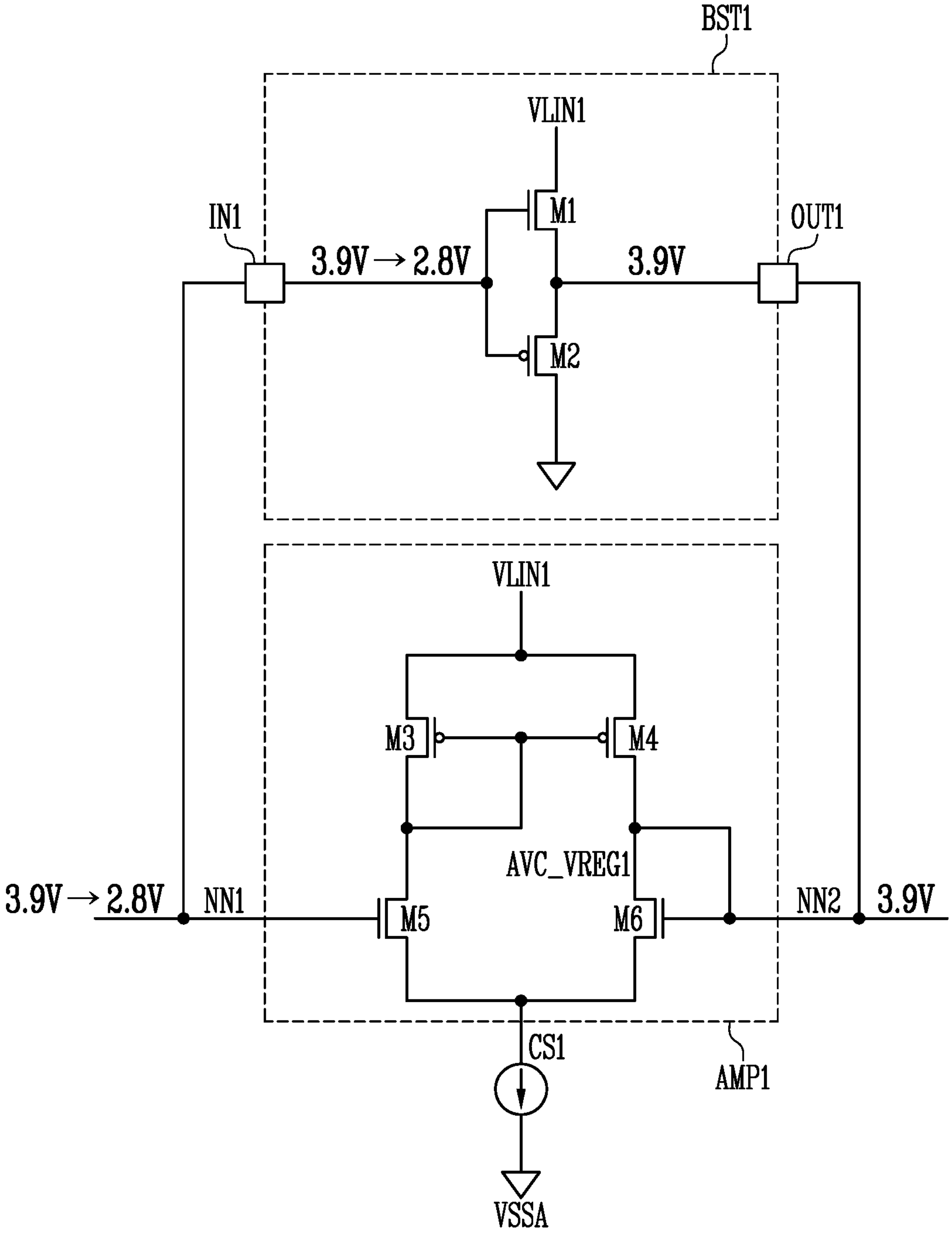
Figure 17:
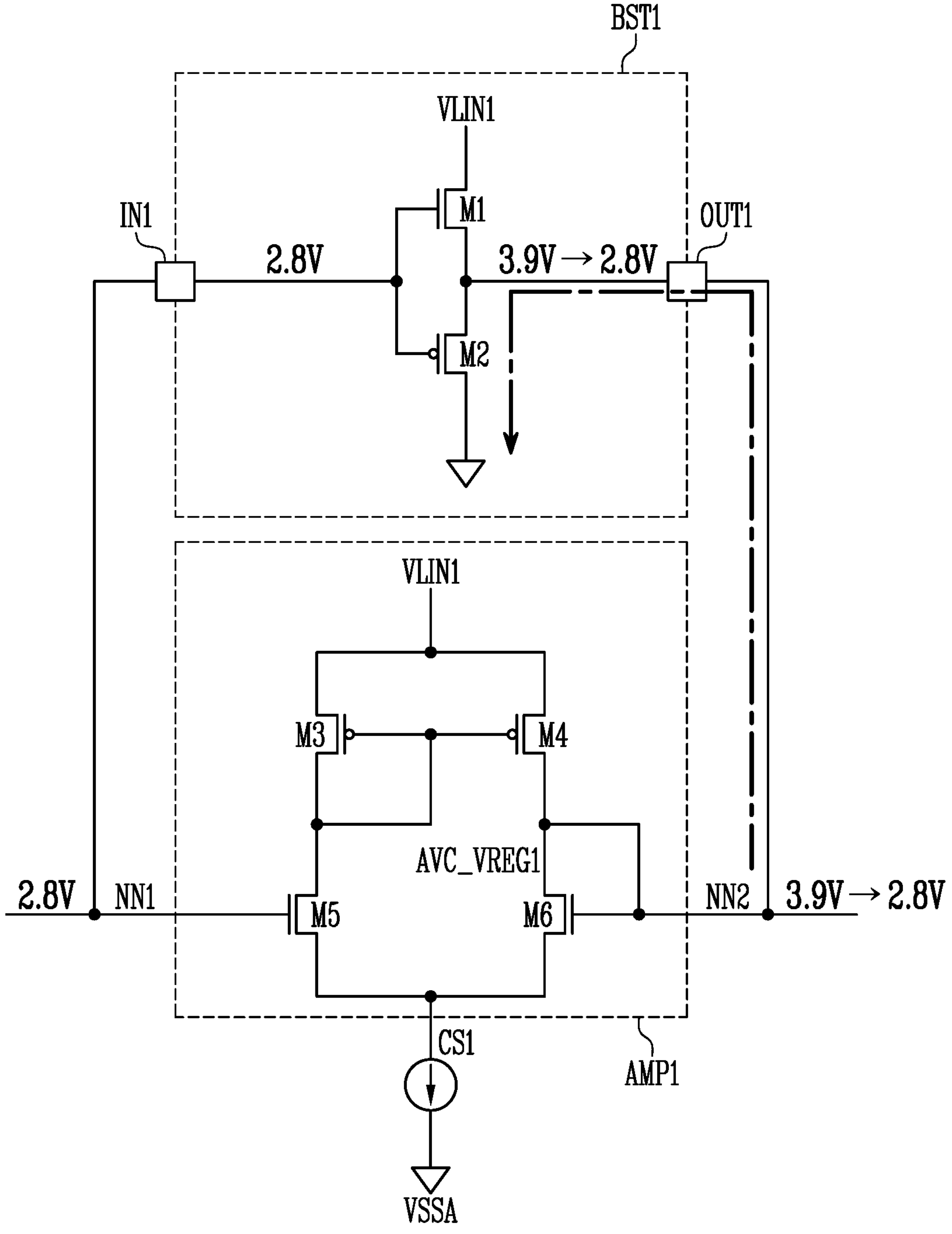

FIGS. 15 to 17 are diagrams for describing a case where the sink current occurs from the first booster circuit BST1.

Referring to FIG. 15, it is assumed that the same voltage of 3.9 V is applied to the first node NN1 and the second node NN2. Here, since the gate voltage and the source voltage of the first transistor M1 are the same as each other, the first transistor M1 is in a turned-off state. Furthermore, since the gate voltage and the source voltage of the second transistor M2 are the same as each other, the second transistor M2 is in a turned-off state.

Referring to FIG. 16, it is assumed that the voltage of the first node NN1 decreases from 3.9 V to 2.8 V. Here, the second transistor M2 is turned on by a gate-source voltage difference, and the first transistor M1 remains turned off.

Referring to FIG. 17, when the second transistor M2 is turned on by a gate-source voltage difference, current flows from the second node NN2 to the ground voltage through the turned-on second transistor M2. Hence, the voltage of the second node NN2 may rapidly decrease.

Figure 18:
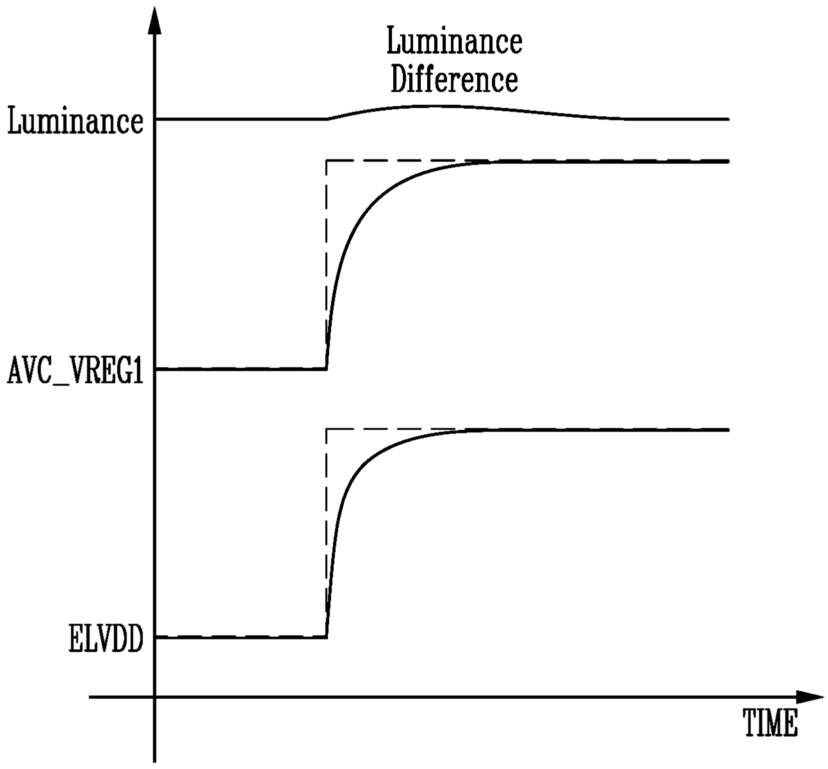

Referring to FIG. 18, it is shown that, compared to the case of FIG. 5, an increase of the first reference voltage AVC_VREG1 rapidly follows an increase of the first power voltage ELVDD. Consequently, for example, a phenomenon in which the luminance of a certain horizontal line in an image differs from that of the other horizontal lines may be mitigated.

FIGS. 19 to 24 are diagrams for describing data drivers in accordance with other embodiments of the disclosure.

Figure 19:
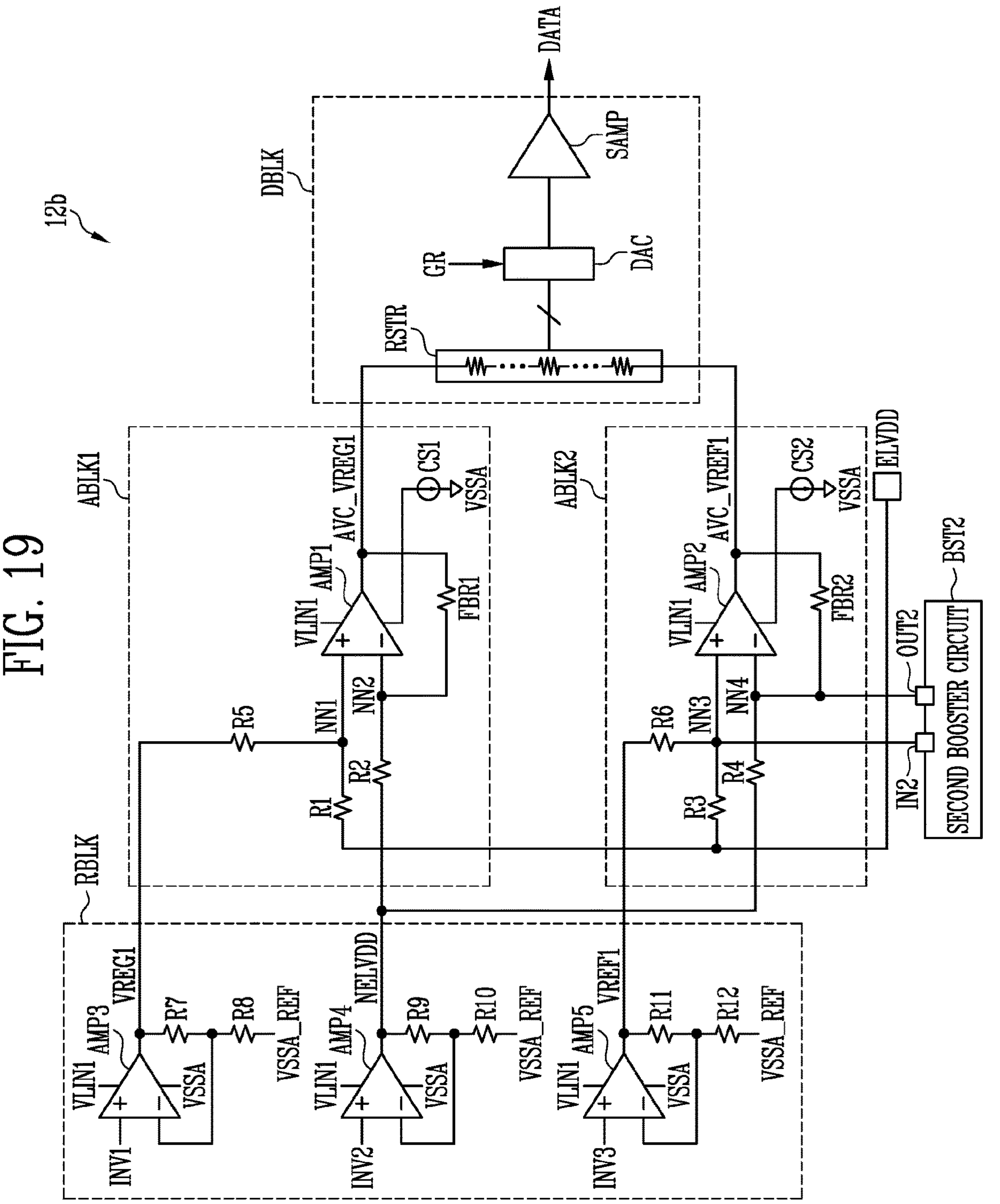
FIGS. 19 to 24 are diagrams for describing data drivers in accordance with other embodiments of the disclosure.

The data driver 12*b* of FIG. 19 is substantially the same as the data driver 12*r* of FIG. 4 except that the data driver 12*b* further includes a second booster circuit BST2. Any repetitive detailed description of the same or like configuration of the data driver 12*b* of FIG. 19 as those of the data driver 12*r* will be omitted to avoid redundant description.

In an embodiment, as shown in FIG. 19, the second booster circuit BST2 may include an input terminal IN2 connected to a first input terminal of the second amplifier AMP2, and an output terminal OUT2 connected to a second input terminal of the second amplifier AMP2. The first input terminal of the second amplifier AMP2 may be a non-inverting terminal, and the second input terminal of the second amplifier AMP2 may be an inverting terminal.

In the second booster circuit BST2, when the voltage of the input terminal IN2 increases, source current may be generated from the output terminal OUT2, and when the voltage of the input terminal IN2 decreases, sink current may be generated from the output terminal OUT2.

Figure 20:
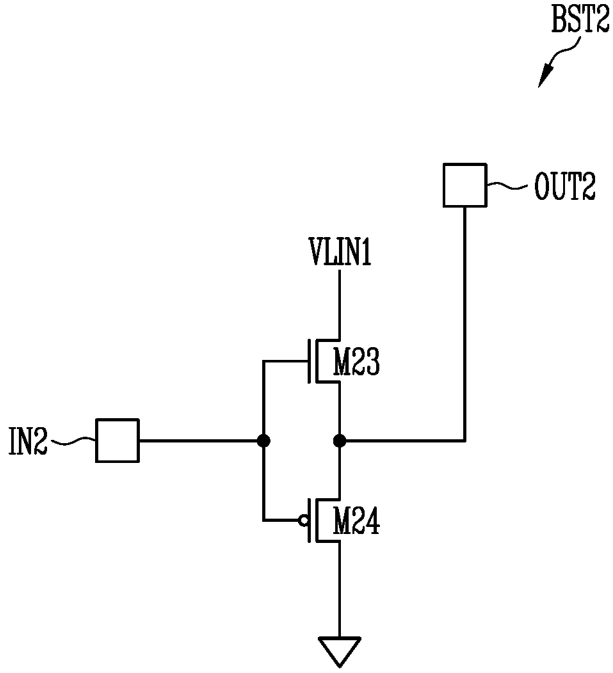

Referring to FIG. 20, in an embodiment, the second booster circuit BST2 may include a third transistor M23, and a fourth transistor M24.

The third transistor M23 may include a gate electrode connected to the input terminal IN2 of the second booster circuit BST2, a first electrode configured to receive a high voltage VLIN1, and a second electrode connected to the output terminal OUT2 of the second booster circuit BST2. The third transistor may be an N-type transistor.

The fourth transistor M24 may include a gate electrode connected to the input terminal IN2 of the second booster circuit BST2, a first electrode connected to the output terminal OUT2 of the second booster circuit BST2, and a second electrode configured to receive a low voltage (e.g., the ground voltage). The fourth transistor M24 may be a P-type transistor.

The configuration and operation of the second booster circuit BST2 may be the same as those of the first booster circuit BST1 described above, therefore, any repetitive detailed description thereof will be omitted.

Figure 21:
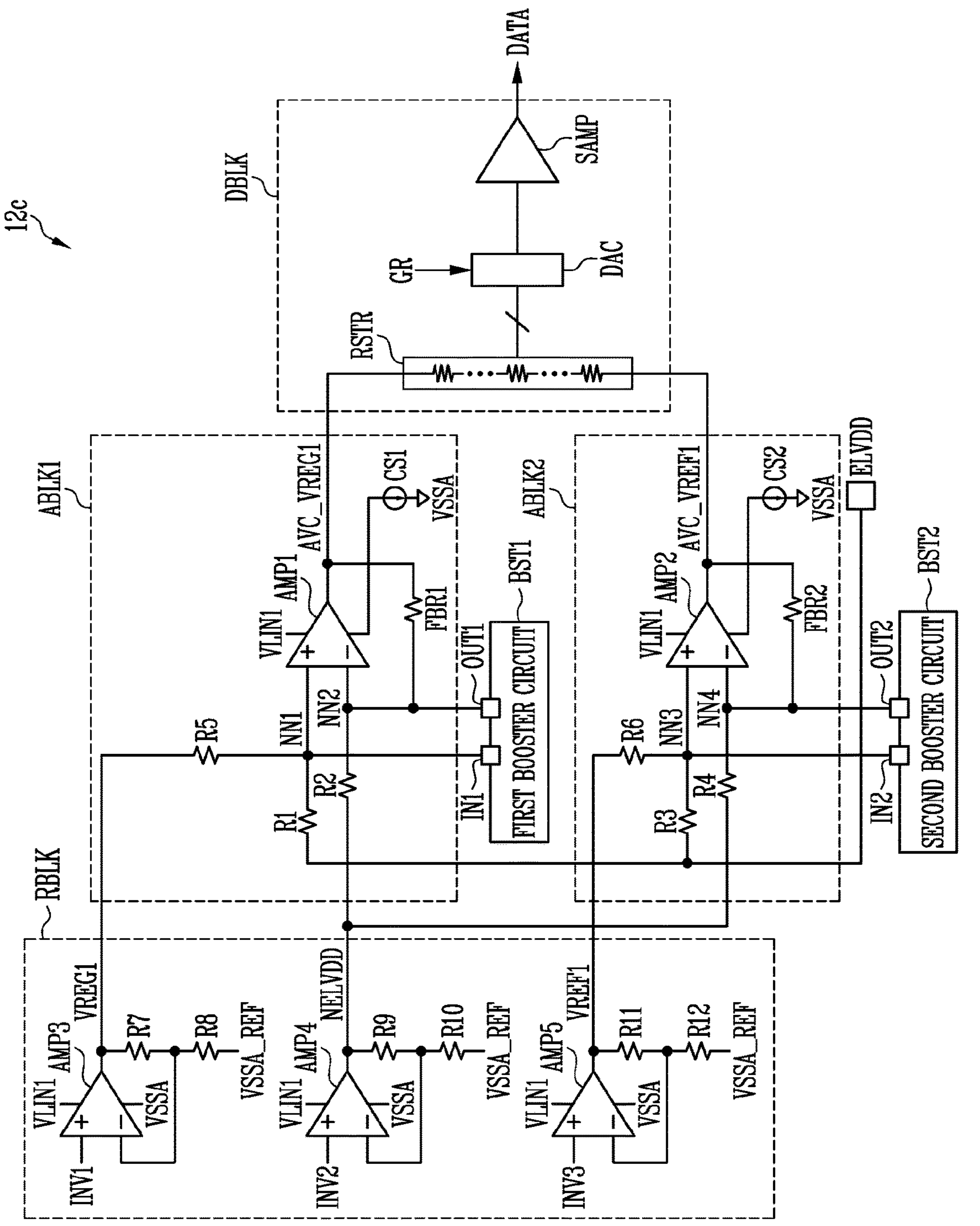

The data driver 12*c* of FIG. 21 is substantially the same as the data driver 12*r* of FIG. 4 except that the data driver 12*c* further includes a first booster circuit BST1 and a second booster circuit BST2. Any repetitive detailed description of the same or like configuration of the data driver 12*c* of FIG. 21 as the data driver 12*r* of FIG. 4 will be omitted to avoid redundant description.

Figure 22:
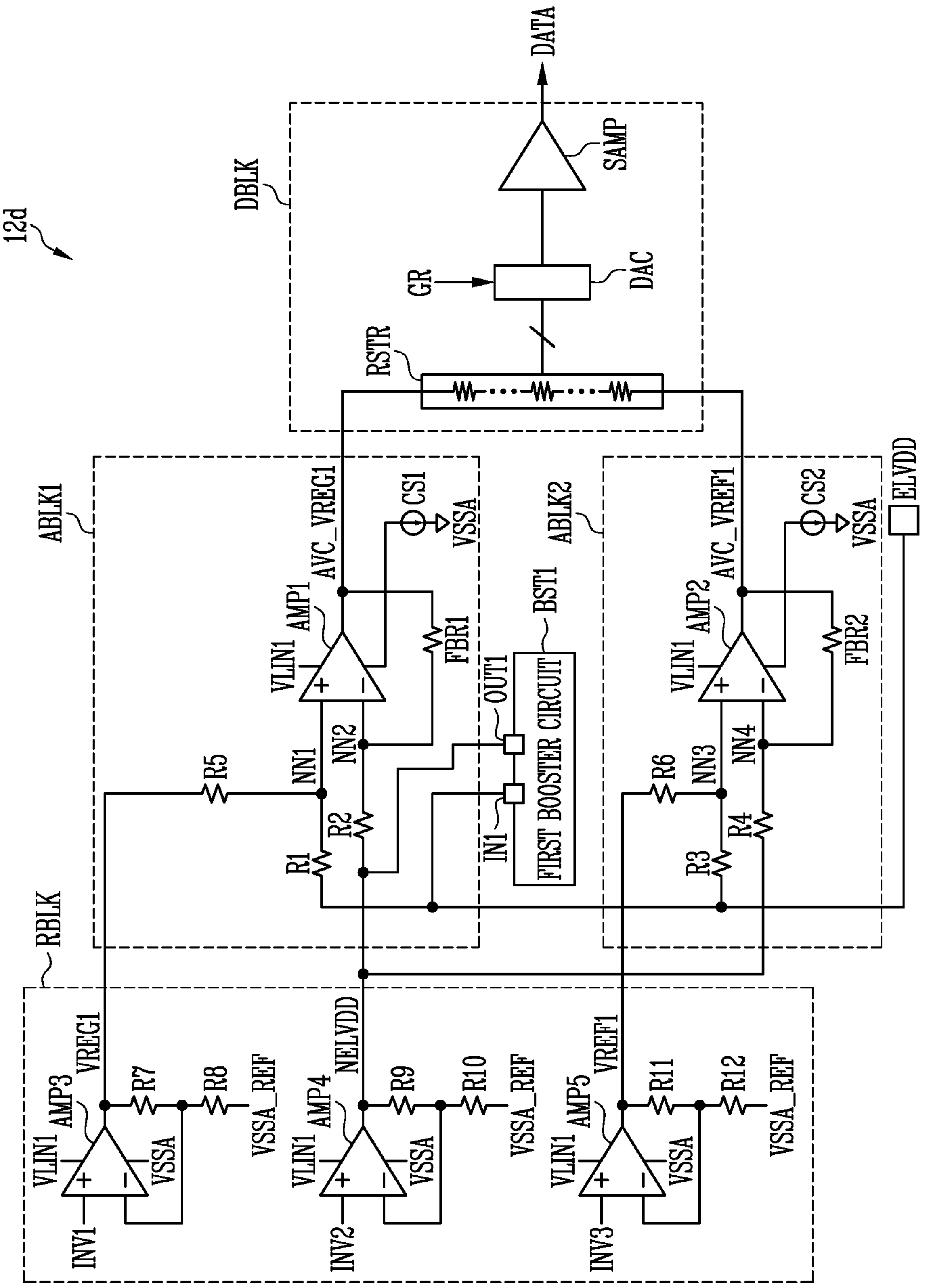

In an alternative embodiment, as shown in FIG. 22, the first booster circuit BST1 of the data driver 12*d* differs in position from the first booster circuit BST1 of the data driver 12*a* of FIG. 10.

In such an embodiment, the first resistor R1 may include a first electrode connected to the first input terminal (i.e., the first node NN1) of the first amplifier AMP1, and a second electrode configured to receive the first power voltage ELVDD. The second resistor R2 may include a first electrode connected to the second input terminal (i.e., the second node NN2) of the first amplifier AMP1, and a second electrode configured to receive the reference voltage NELVDD.

The first booster circuit BST1 may include an input terminal IN1 connected to the second electrode of the first resistor R1, and an output terminal connected to the second electrode of the second resistor R2. The configuration and operation of the first booster circuit BST1 are the same as those described above; therefore, any repetitive detailed description thereof will be omitted.

Figure 23:
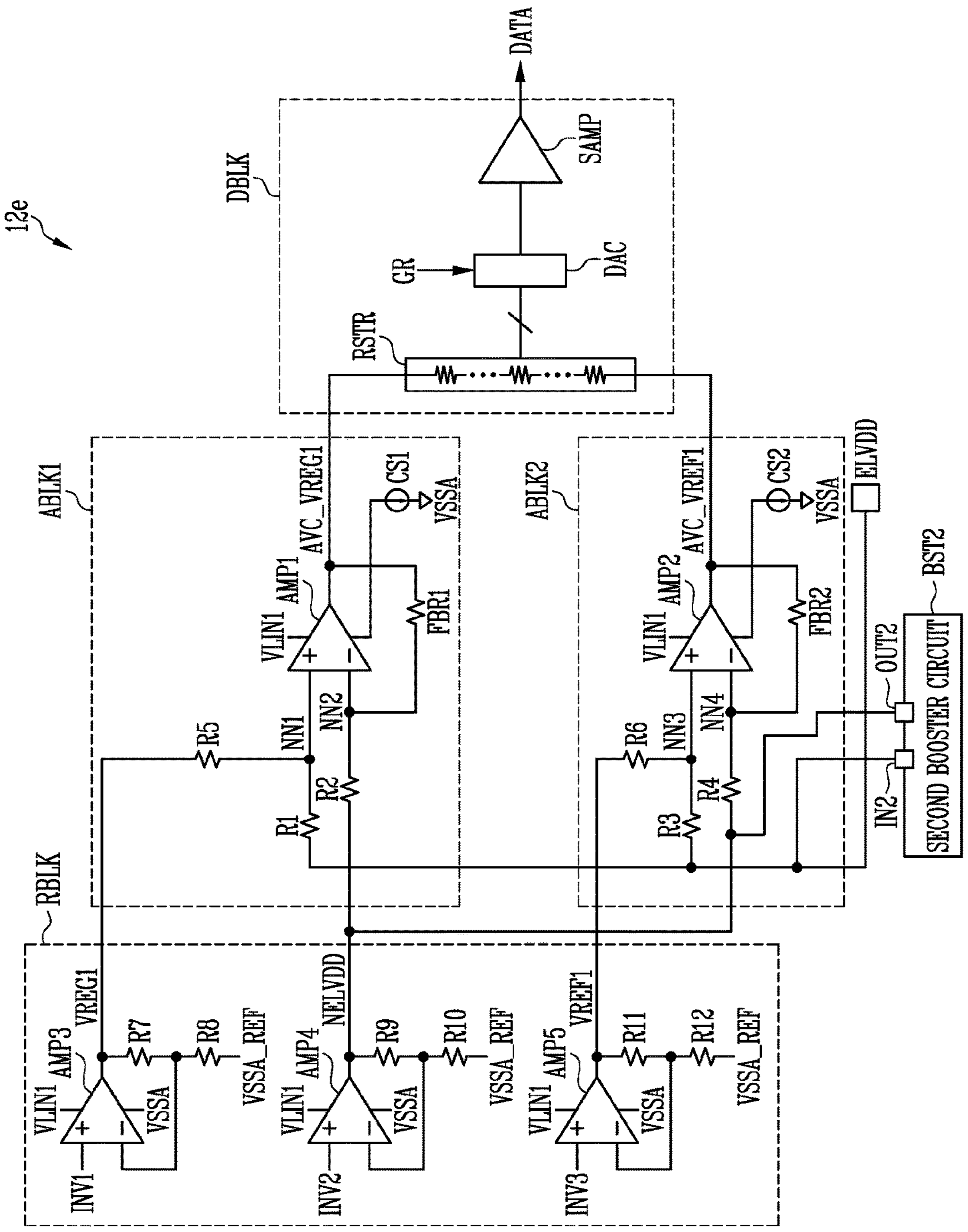

In an embodiment, as shown in FIG. 23, the second booster circuit BST2 of the data driver 12*e* differs in position from the second booster circuit BST2 of the data driver 12*b* of FIG. 19.

In such an embodiment, the third resistor R3 may include a first electrode connected to the first input terminal (i.e., the third node NN3) of the second amplifier AMP2, and a second electrode configured to receive the first power voltage ELVDD. The fourth resistor R4 may include a first electrode connected to the second input terminal (i.e., the fourth node NN4) of the second amplifier AMP2, and a second electrode configured to receive the reference voltage NELVDD.

The second booster circuit BST2 may include an input terminal IN2 connected to the second electrode of the third resistor R3, and an output terminal OUT2 connected to the second electrode of the fourth resistor R4. The configuration and operation of the second booster circuit BST2 are the same as those described above; therefore, any repetitive detailed description thereof will be omitted.

Figure 24:
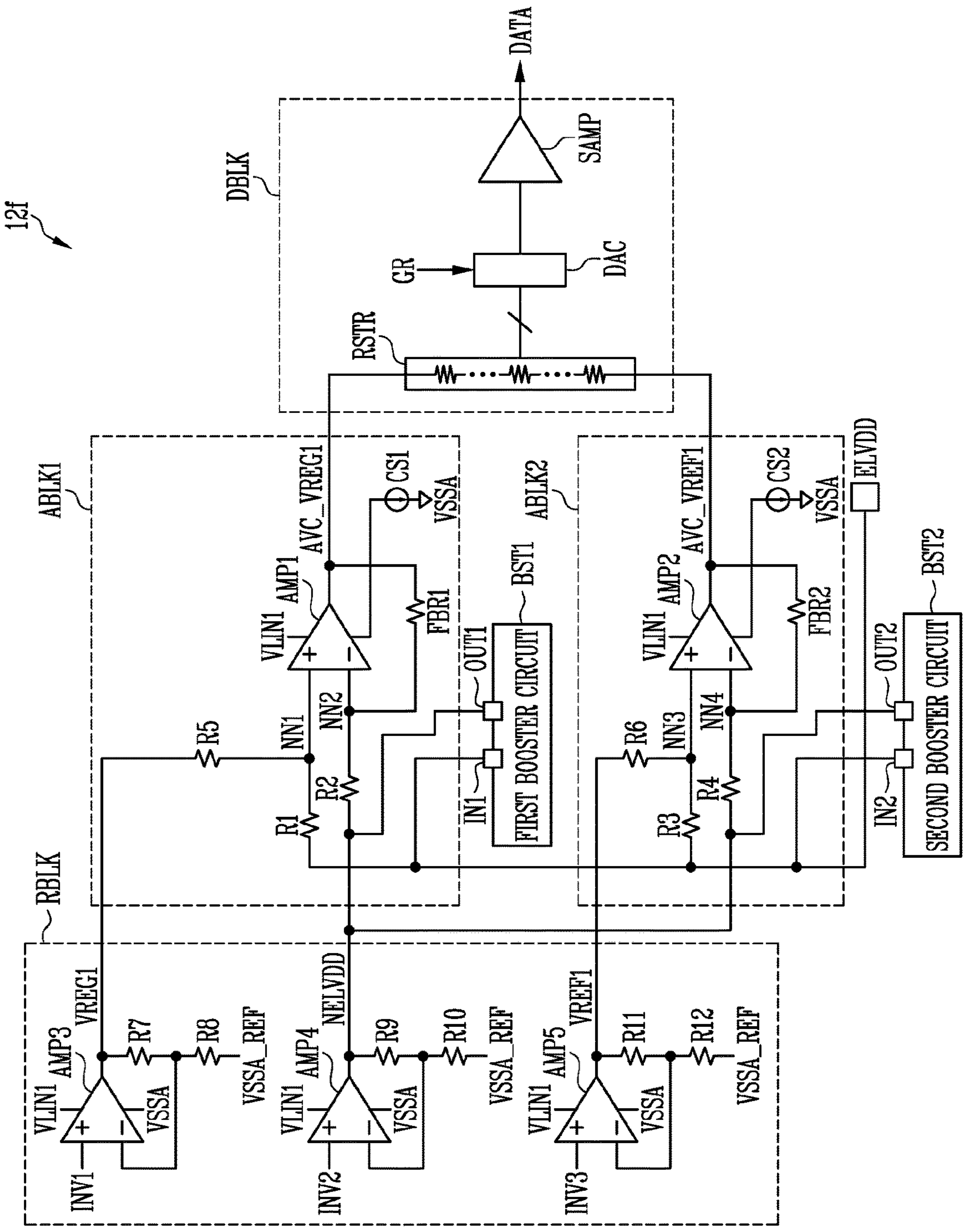

In an embodiment, as shown in FIG. 24, the data driver 12*f* differs from the data drivers 12*d* and 12*e* of FIGS. 22 and 23 in that the data driver 12*f* further includes both a first booster circuit BST1 and a second booster circuit BST2.

In a display device in accordance with an embodiment of the disclosure, data voltages may rapidly follow a change of a first power voltage of a pixel.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a pixel which emits light at a luminance corresponding to a data voltage applied thereto; and a data driver which supplies the data voltage to the pixel, wherein the data driver comprises:

a first amplifier which outputs a first reference voltage;

a first booster circuit comprising an input terminal connected to a first input terminal of the first amplifier, and an output terminal connected to a second input terminal of the first amplifier;

a second amplifier which outputs a second reference voltage;

a resistance string which receives the first reference voltage and the second reference voltage, and generates gamma voltages which are intermediate voltages between the first reference voltage and the second reference voltage;

a digital-analog converter which outputs a gamma voltage corresponding to a gray scale of the pixel among the gamma voltages; and a source amplifier which outputs the gamma voltage as the data voltage.

2. The display device according to claim 1, wherein when a voltage of the input terminal of the first booster circuit increases, source current is generated from the output terminal of the first booster circuit, and when the voltage of the input terminal of the first booster circuit decreases, sink current is generated from the output terminal of the first booster circuit.

3. The display device according to claim 2, wherein the first input terminal of the first amplifier is a non-inverting terminal, and wherein the second input terminal of the first amplifier is an inverting terminal.

4. The display device according to claim 1, wherein the first booster circuit comprises:

a first transistor comprising a gate electrode connected to the input terminal of the first booster circuit, a first electrode which receives a high voltage, and a second electrode connected to the output terminal of the first booster circuit; and a second transistor comprising a gate electrode connected to the input terminal of the first booster circuit, a first electrode connected to the output terminal of the first booster circuit, and a second electrode which receives a low voltage.

5. The display device according to claim 4, wherein the first transistor comprises an N-type transistor, and wherein the second transistor comprises a P-type transistor.

6. The display device according to claim 4, wherein the data driver further comprises a second booster circuit comprising an input terminal connected to a first input terminal of the second amplifier, and an output terminal connected to a second input terminal of the second amplifier.

7. The display device according to claim 6, wherein when a voltage of the input terminal of the second booster circuit increases, source current is generated from the output terminal of the second booster circuit, and when the voltage of the input terminal of the second booster circuit decreases, sink current is generated from the output terminal of the second booster circuit.

8. The display device according to claim 7, wherein the first input terminal of the second amplifier comprises a non-inverting terminal, and wherein the second input terminal of the second amplifier comprises an inverting terminal.

9. The display device according to claim 6, wherein the second booster circuit comprises:

a third transistor comprising a gate electrode connected to the input terminal of the second booster circuit, a first electrode which receives a high voltage, and a second electrode connected to the output terminal of the second booster circuit; and a fourth transistor comprising a gate electrode connected to the input terminal of the second booster circuit, a first electrode connected to the output terminal of the second booster circuit, and a second electrode which receives a low voltage.

10. The display device according to claim 9, wherein the third transistor comprises an N-type transistor, and wherein the fourth transistor comprises a P-type transistor.

11. The display device according to claim 1, wherein the data driver further comprises a first resistor comprising a first electrode connected to the input terminal of the first booster circuit, and a second electrode which receives a first power voltage of the pixel.

* * * * *